(12) United States Patent
Pearse et al.

(10) Patent No.: US 11,421,809 B2
(45) Date of Patent: Aug. 23, 2022

(54) EXPANSION JOINTS FOR A TUBULAR TRANSPORTATION SYSTEM

(71) Applicant: HYPERLOOP TECHNOLOGIES, INC., Los Angeles, CA (US)

(72) Inventors: Luke Pearse, Manhattan Beach, CA (US); Blake Cole, Redondo Beach, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 1322 days.

(21) Appl. No.: 15/452,107

(22) Filed: Mar. 7, 2017

(65) Prior Publication Data

US 2017/0254456 A1 Sep. 7, 2017

Related U.S. Application Data

(60) Provisional application No. 62/314,058, filed on Mar. 28, 2016, provisional application No. 62/304,670, filed on Mar. 7, 2016.

(51) Int. Cl.
| | |
|---|---|
| *F16L 51/00* | (2006.01) |
| *B61B 13/10* | (2006.01) |
| *F16L 27/12* | (2006.01) |
| *F16L 17/10* | (2006.01) |

(52) U.S. Cl.
CPC .............. *F16L 51/00* (2013.01); *B61B 13/10* (2013.01); *F16L 17/10* (2013.01); *F16L 27/12* (2013.01)

(58) Field of Classification Search
CPC . F16L 27/12; F16L 51/00; F16L 17/10; B61B 13/10
See application file for complete search history.

(56) References Cited

U.S. PATENT DOCUMENTS

| | | | | |
|---|---|---|---|---|
| 2,127,073 | A | * | 8/1938 | Topping ................... F16L 27/12 285/41 |
| 2,308,757 | A | * | 1/1943 | Hulsberg .......... F16L 27/12751 285/96 |
| 2,323,179 | A | * | 6/1943 | Hall ........................ F16L 27/12 277/513 |

(Continued)

FOREIGN PATENT DOCUMENTS

| | | |
|---|---|---|
| GB | 1 161 664 | 8/1969 |
| GB | 1 387 056 | 3/1975 |

(Continued)

OTHER PUBLICATIONS

Parker Hannifin Corporation, Fluid Power Seal Design Guide, Catalog EPS 5370, Jun. 2014.

(Continued)

*Primary Examiner* — James M Hewitt, II
(74) *Attorney, Agent, or Firm* — Greenblum & Bernstein, P.L.C.

(57) ABSTRACT

A tubular structure includes at least one exterior tube and at least one interior tube, at least a portion of the interior tube is disposed within the exterior tube. The tubular structure further includes at least one expansion joint provided between the exterior tube and the interior tube and the expansion joint allows lateral expansion or contraction of the exterior tube and the interior tube and maintains a pressure within the exterior and the interior tubes.

11 Claims, 21 Drawing Sheets

(56) References Cited

U.S. PATENT DOCUMENTS

| | | | | |
|---|---|---|---|---|
| 2,666,454 | A | * | 1/1954 | Richmond .............. F16L 27/12 |
| | | | | 138/44 |
| 2,956,823 | A | | 10/1960 | Benjamin, Jr. et al. |
| 3,399,545 | A | | 9/1968 | Anderson et al. |
| 3,664,690 | A | * | 5/1972 | Williams, III et al. . F16L 17/10 |
| | | | | 285/96 |
| 4,225,143 | A | | 9/1980 | Hannah |
| 4,247,838 | A | | 1/1981 | Sirel |
| 4,357,860 | A | | 11/1982 | Krzak |
| 4,496,130 | A | | 1/1985 | Toyama |
| 2008/0067754 | A1 | * | 3/2008 | Schroeder .............. F16J 15/006 |
| | | | | 277/437 |
| 2014/0131606 | A1 | * | 5/2014 | Smith, III ........... E21B 33/0355 |
| | | | | 251/282 |
| 2015/0240980 | A1 | * | 8/2015 | Bobo .................. F16L 37/0915 |
| | | | | 285/321 |

FOREIGN PATENT DOCUMENTS

| | | | |
|---|---|---|---|
| GB | 1 510 233 | 5/1978 | |
| GB | 2102091 A | * 1/1983 | ........ F16L 27/12751 |

OTHER PUBLICATIONS

Parker Hannifin Corporation, Industrial Piston and Rod T-Seals, Catalog PPD-3001A/USA, Copyright 1999.
Smith-Blair, 611 Expansion Joints, Single End, pp. 5-7, Aug. 2014.
International Search Report in PCT/US2017/021134 dated May 25, 2017.
Written Opinion of the International Searching Authority in PCT/US2017/021134 dated May 25, 2017.

* cited by examiner

EXPANSION JOINTS FOR A TUBULAR TRANSPORTATION SYSTEM

CROSS REFERENCE TO RELATED APPLICATIONS

The present application claims the benefit of U.S. Provisional Application No. 62/304,670 filed on Mar. 7, 2016, and U.S. Provisional Application No. 62/314,058 filed on Mar. 28, 2016, the disclosures of which are expressly incorporated by reference herein in their entireties.

FIELD OF THE DISCLOSURE

The present disclosure relates to expansion joints for a tubular transportation system.

BACKGROUND OF THE DISCLOSURE

Traditional transportation modes via water, land, rail and air revolutionized the movement and growth of our current culture. Adverse environmental, societal, and economic impacts of these traditional transportation models, however, initiated a movement to find alternative transportation modes that take advantage of the significant improvements in transportation technology, and efficiently move people and materials between locations. High-speed transportation systems utilizing rails or other structural guidance components have been contemplated as a solution to existing transportation challenges while improving safety, decreasing the environmental impact of traditional transportation modes and reducing the overall time commuting between major metropolitan communities.

A high speed, high efficiency transportation system may utilize a low-pressure environment in order to reduce drag on a vehicle at high operating speeds, thus providing the dual benefit of allowing greater speed potential and lowering the energy costs associated with overcoming drag forces. In embodiments, these systems may use a near-vacuum (e.g., low-pressure) environment within a tubular structure.

Several systems have been designed to accommodate predetermined magnitudes of thermal axial expansion within pipes in general. Two such systems include bellows-style expansion joints and slip-style expansion joints. Bellows-style expansion joints are incorporated into the piping system, such that ruffles are included in segments of the pipe itself. Deflection of the ruffled sections absorbs vertical and horizontal forces, allowing the rigid segments of the pipe to maintain their position. Ruffled sections incorporated into the pipe, however, create design challenges and lead to high manufacturing costs. Additionally, the frequent deflection of bellows-style expansion joints increases the incidence of joint failure resulting from, for example, in-plane squirm, column-squirm, fatigue, creep fatigue, burst, collapse, overstretching, corrosion, etc. Bellows-style expansion joints also lack the ability to resist bending moments, as there lacks lateral and/or angular rigidity within the joint.

Traditional slip joints address some, but not all, of these shortcomings of bellows-style expansion joints. Slip joints operate as follows: at a connection point of piping, there is an outer tube connected to one side and inner tube connected to the other side. The inner tube, or slip tube, is able to slide in and out of the outer tube, which allows the slip joint to absorb the linear expansion of the pipe. Slip joints may typically be heavier than a bellows-style expansion joint, but may also be cheaper to manufacture, may afford longer longitudinal expansions and/or contractions and may be significantly more robust. Slip joints however rely on "packing material," including, for example, a viscous fluid such as oil or grease, to diminish friction so that the tubes can slide, as well as to provide some additional pressure seal by filling the small gaps in the joint.

The packing material generates issues associated with the need for frequent lubrication and replacement, which is expensive, time-consuming, and could necessitate unacceptable closure of the pipeline of the transportation system. Further, in traditional slip joints the interior is typically maintained at a pressure that is greater than a pressure in an environment surrounding the exterior of the pipes. Accordingly, the pressure gradient between the interior of the pipes and the exterior environment may tend to drive any leakage of the packing material to the exterior, rather than the interior of the pipe. Additionally, traditional slip joints do not scale for use on pipes at the size required for the transportation system. That is, traditional slip joints scaled to large diameter sizes become increasingly inefficient, and thus may not be suited for use in such transportation systems. For example, the packing material of traditional slip joints may tend to settle at the lowest point of the joint leading to a maldistribution around the circumference of the joint; a problem that is exacerbated as the diameter of the joint increases.

Accordingly, there exists a need for improved expansion joints adapted for use in a low pressure environment transportation system.

SUMMARY OF THE EMBODIMENTS OF THE DISCLOSURE

Aspects of the present disclosure are directed to a tubular structure, comprising at least one exterior tube having an opening and an interior, at least one interior tube, at least a portion of the at least one interior tube is configured to be disposed through the opening and within the interior of the at least one exterior tube, and at least one expansion joint provided between the at least one exterior tube and the portion of the at least one interior tube. The at least one expansion joint is configured to allow lateral expansion and contraction of the exterior tube and the interior tube while maintaining a predetermined pressure within the exterior and the interior tubes.

By implementing aspects of the present disclosure, expansion joints having diameters large enough for use in the low pressure environment transportation system may be provided. Further, the need for a packing material may be eliminated or reduced. Accordingly, leakage of the packing material into the interior of the transportation system, driven by the pressure gradient of the low pressure environment, may be obviated or reduced.

In further embodiments, the expansion joint comprises a removable O-ring sled structured and arranged to be attached to an end of the exterior tube.

In additional embodiments, the tubular structure further comprises at least one friction sliding pad structured and arranged on an inner circumferential surface of the exterior tube. The at least one friction sliding pad supports an outer circumferential surface of the portion of the interior tube and provides a low friction surface for facilitating sliding of the interior tube relative to the exterior tube in a longitudinal direction of the tubular structure.

In some embodiments, the expansion joint further comprises a service seal structured and arranged within the interior of the exterior tube beyond the O-ring sled in a longitudinal direction of the exterior tube. The service seal is structured and arranged to selectively provide a seal between the exterior tube and the interior tube.

In certain embodiments, the service seal and the O-ring sled are each configured to independently provide a seal between the exterior tube and the interior tube.

In yet further embodiments, the service seal comprises an inflatable seal that, when inflated, selectively provides the seal between the exterior tube and the interior tube.

In further embodiments, the O-ring sled comprises at least one sealing O-ring structured and arranged to form a seal between the exterior tube and the interior tube.

In additional embodiments, the at least one sealing O-ring is a T-style O-ring.

In certain embodiments, the O-ring sled comprises at least one lubricator that is configured to lubricate an outer circumferential surface of the interior tube.

In some embodiments, the tubular structure further comprises a lubricant reservoir. The lubricator contacts the outer circumferential surface of the interior tube and supplies lubricant via the lubricant reservoir disposed on an outer circumferential surface of the exterior tube.

In yet further embodiments, the O-ring sled is structured and arranged in at least two segments so as to be removable from the expansion joint without requiring removal of the portion of the at least one interior tube configured to be disposed within the interior of the at least one exterior tube.

In additional embodiments, the expansion joint comprises a tubular rolling seal belt, and the rolling seal belt has a first end attached to an outer circumferential surface of the interior tube and a second end attached to an inner circumferential surface of the exterior tube.

In additional embodiments, the rolling seal belt comprises a flexible material reinforced by a reinforcement material.

In some embodiments, the second end of the rolling seal belt is attached to the inner circumferential surface of the exterior tube via a tubular connector structured and arranged to apply a compressive force to the rolling real belt.

In some embodiments, the tubular connector includes at least two arcuate band sections connected at ends thereof via fixing sections.

In further embodiments, the ends of the arcuate band sections are adjustably connected to the fixing sections such that a space between the ends of the arcuate band sections may be adjusted.

In yet further embodiments, the rolling seal belt is able to fold back upon itself and is configured to roll laterally such that an effective lateral length of the rolling seal belt is adjustable.

In additional embodiments, the tubular structure further comprises a second rolling seal belt. The tubular rolling seal belt is a first rolling seal belt, and the first rolling seal belt is attached to the opening of the exterior tube and the second rolling seal belt is attached to a second opening of the exterior tube.

In yet further embodiments, the exterior tube is attached to a pylon via a bearing.

Additional aspects of the present disclosure are directed to a method of maintaining a predetermined pressure within a tubular structure having an interior tube, an exterior tube, a pressure-tight service seal, and an O-ring sled disposed between the interior tube and the exterior tube. The method comprises establishing an interior of the tubular structure at the predetermined pressure, engaging the pressure-tight service seal between the interior tube and the exterior tube, and removing the O-ring sled from the tubular structure while the pressure-tight service seal maintains the predetermined pressure of the interior of the tubular structure.

BRIEF DESCRIPTION OF THE DRAWINGS

The novel features which are characteristic of the systems, both as to structure and method of operation thereof, together with further aims and advantages thereof, will be understood from the following description, considered in connection with the accompanying drawings, in which embodiments of the system are illustrated by way of example. It is to be expressly understood, however, that the drawings are for the purpose of illustration and description only, and they are not intended as a definition of the limits of the system. For a more complete understanding of the disclosure, as well as other aims and further features thereof, reference may be had to the following detailed description of the disclosure in conjunction with the following exemplary and non-limiting drawings wherein.

DETAILED DISCLOSURE

Figure 1:
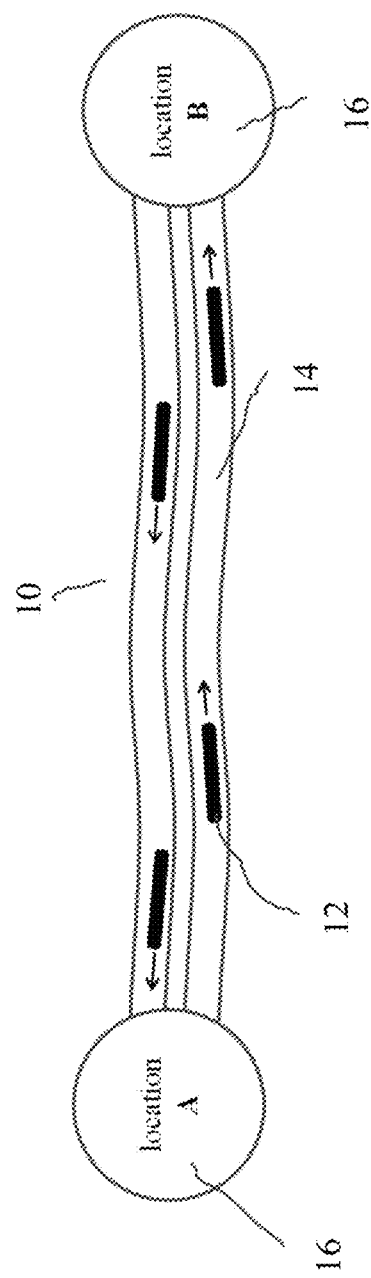
FIG. 1 is a schematically-depicted view of a transportation system in accordance with aspects of the present disclosure.

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also indicate that mixtures of one or more magnetic materials can be present unless specifically excluded.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions (unless otherwise explicitly indicated).

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" indicates "only A, or only B, or both A and B." In the case of "only A," the term also covers the possibility that B is absent, i.e. "only A, but not B."

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for instance a composition comprising a compound A may include other compounds besides A. However, the term "comprising" also covers the more restrictive meanings of "consisting essentially of" and "consisting of," so that for instance "a composition comprising a compound A" may also (essentially) consist of the compound A.

The various embodiments disclosed herein can be used separately and in various combinations unless specifically stated to the contrary.

Referring to FIG. 1, a transportation system 10 in accordance with aspects of the present disclosure is illustrated. In embodiments, the transportation system 10 comprises one or more capsules or transport pods 12 traveling through at least one enclosed structure (e.g., a tube) 14 between two or more stations 16. In one exemplary embodiment of the present disclosure, the capsules 12 of the transportation system 10 move through a low-pressure environment within the at least one enclosed structure 14. In accordance with certain aspects of the disclosure, the low-pressure environment includes (but is not limited to) any pressure that is below 1 atmosphere (or approximately 1 bar) at sea level.

Some elements of a high-speed transportation system are discussed in commonly-assigned U.S. application Ser. No.

15/007,783, entitled "Transportation System," filed in the USPTO on Jan. 27, 2016, now Pat. No. 9,718,630, the entire content of which is expressly incorporated by reference herein in its entirety.

In embodiments of the present disclosure, the transportation system 10 comprises one or more partially evacuated enclosed structures 14 that connect stations 16 in a closed loop system. In embodiments, enclosed structures 14 may be sized for optimal air flow around the capsule 12 to improve performance and energy consumption efficiency at the expected or design travel speed. In accordance with aspects of the disclosure, the low-pressure environment in the enclosed structures 14 minimizes the drag force on the capsule 12, while maintaining the relative ease of pumping out the air from the tubes.

Figure 2:
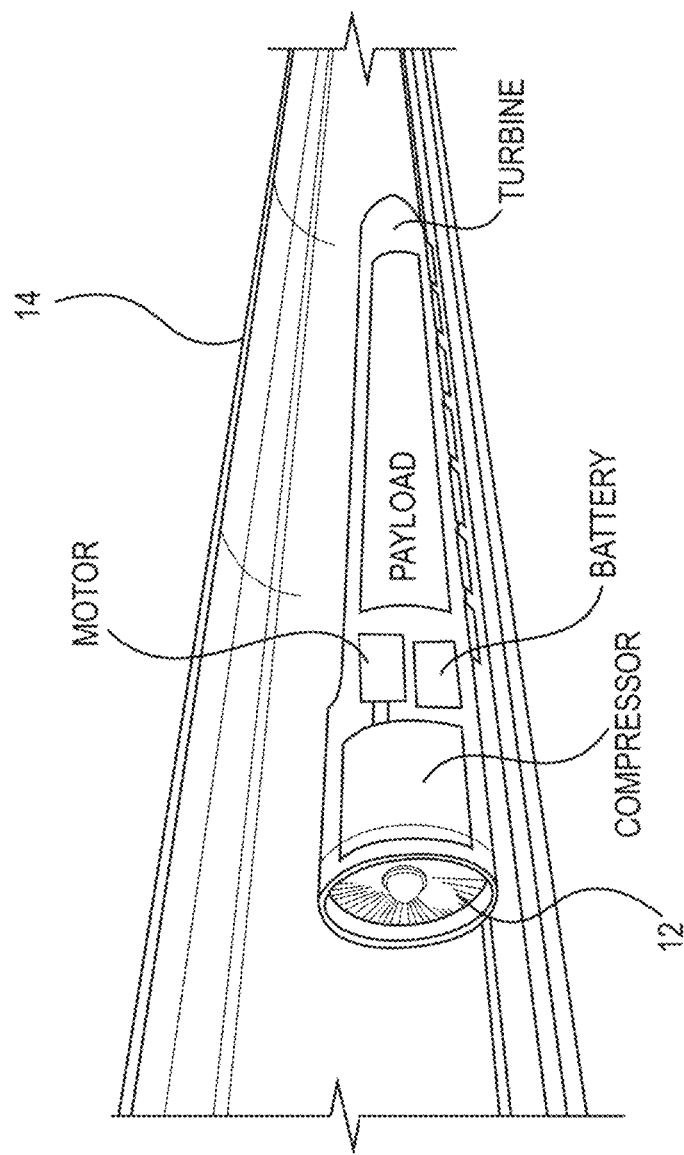
FIG. 2 illustrates a view of an exemplary capsule for use in the transportation system in accordance with aspects of the present disclosure.

Referring now to FIG. 2, an exemplary and non-limiting depiction of the capsule or transport pod 12 of the transportation system 10 is illustrated. In embodiments, the capsule 12 may be streamlined to reduce an air drag coefficient as the capsule 12 travels through the low-pressure environment of the at least one enclosed structure 14 (e.g., tube) of the transportation system 10. In accordance with aspects of the disclosure, in certain embodiments, a compressor arranged at the front end of the capsule is operable to ingest at least a portion of the incoming air and pass it through the capsule (instead of displacing the air around the vehicle). For example, as schematically shown in the exemplary embodiment of FIG. 2, the capsule 12 may include a compressor at its leading face. In embodiments, the compressor is operable to ingest oncoming air and may utilize the compressed air for the levitation process (when, for example, the capsules are supported via air bearings that operate using a compressed air reservoir and aerodynamic lift). Additionally, as schematically shown in the exemplary embodiment of FIG. 2, in embodiments, the compressed air may be used to spin a turbine, for example, located at the rear end of the capsule, to provide power to the capsule 12. As schematically shown in the exemplary embodiment of FIG. 2, the capsule 12 may also include a motor structured and arranged to drive the compressor, and a battery for storing energy, e.g., derived from the turbine. The capsule 12 also includes a payload area, which may be configured for humans, for cargo, and/or for both humans and cargo.

Figure 3:
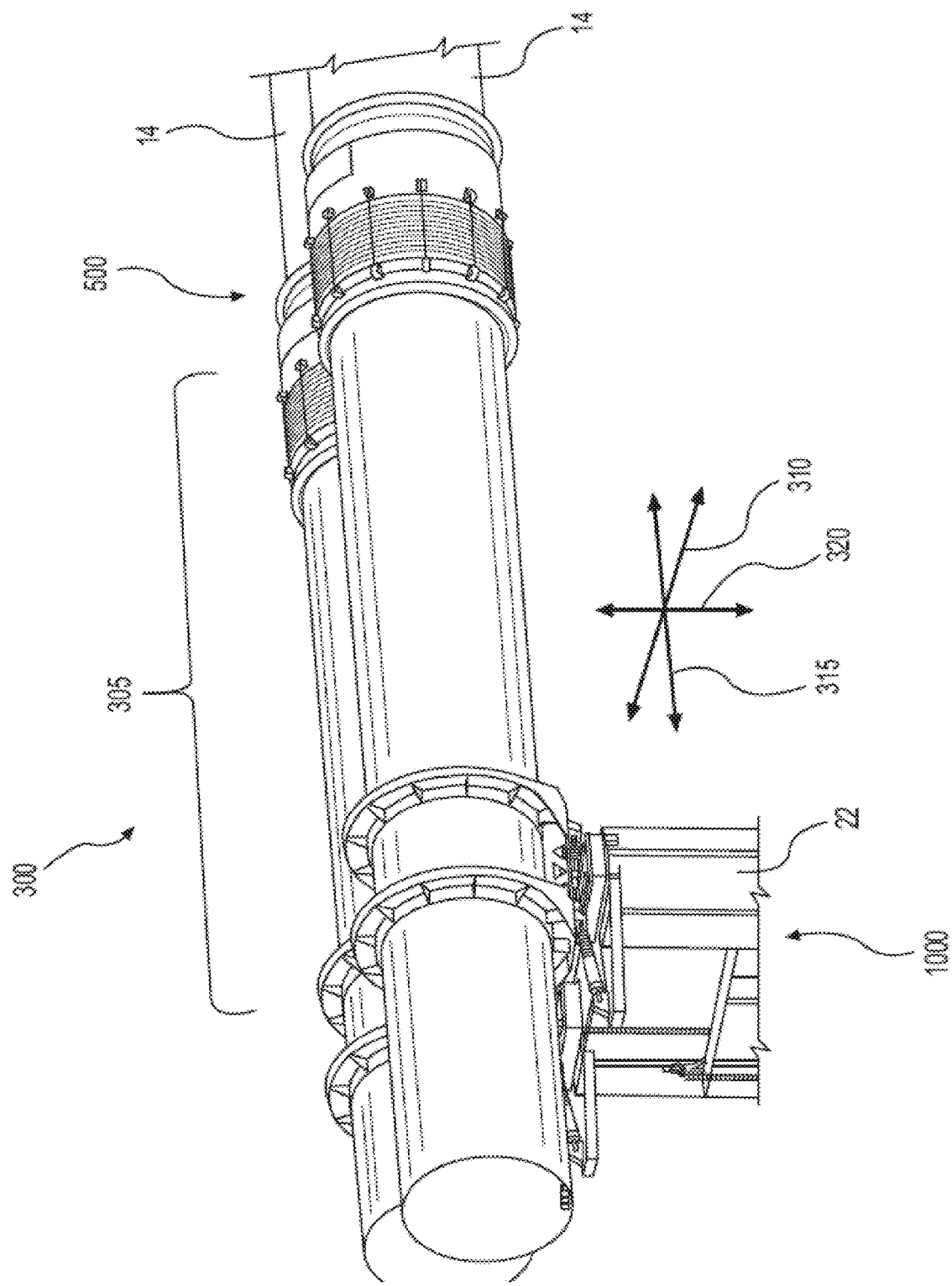
FIG. 3 illustrates a schematically-depicted perspective view of aspects of a tubular structure stability system in accordance with aspects of the present disclosure.

FIG. 3 illustrates a schematic perspective view 300 of exemplary aspects of a tubular structure stability system in accordance with embodiments of the present disclosure. Some elements of the tubular structure stability system are discussed in commonly-assigned U.S. application Ser. No. 15/007,745, entitled "Expansion Joints, Dampers and Control Systems for a Tubular Transportation Structure Stability System," filed in the USPTO on Jan. 27, 2016, now abandoned, the entire content of which is expressly incorporated by reference herein.

As shown in the non-limiting embodiment of FIG. 3, a pair of cylindrical tubes 14 are generally positioned in a side-by-side configuration. In certain embodiments, tubes 14 are supported above ground (not shown) by a series of supports (e.g., pillars or pylons 22, with only one shown in FIG. 3) spaced apart along a path of travel. In an exemplary and non-limiting embodiment, the pillars 22 may be placed approximately every 100 feet (30 m) along the transportation path.

In accordance with aspects of the disclosure, embodiments include one or more systems for isolating a tubular system from the ground, for example, through the use of linear slides and dampers, as well as thermal expansion joints, to allow the relatively rigid tube to translate (or move) relative to the support pylons and/or expand or contract as necessary to compensate for, e.g., the daily thermal cycle and/or internal system heat production. As discussed herein, embodiments may utilize, for example, local linear slides and spring-dampers that enable centering and long timescale expansion and contraction of the tube. Embodiments may also utilize axial expansion joints (e.g., periodic axial expansion joints) to compensate for any limitation of travel of the tube on the pylon that may be imposed by the structure and operational range of the linear slides and dampers. As discussed herein, embodiments enable an expansion of a tube to be translated onto the axial (or longitudinal) and transverse (or lateral) planes. For example, with some embodiments, up to one meter of axial and transverse movement may be displaced locally to the pylons. Additionally, in one exemplary embodiment, a thermal expansion joint may be configured to undergo up to 1.5 meters of expansion for every kilometer of the tube length, which can accommodate up to a 100 degree Celsius temperature change in the tube structure.

As shown in FIG. 3, in some embodiments, the tubular structure stability system 300 may include at least one expansion joint 500 arranged on a tube 14, which is structured and arranged to enable a relative movement between sections of the tube 14 in longitudinal directions 315 to adjust for longitudinal forces acting on the tubes 14 (e.g., expansion and/or contraction of tubes due to thermal conditions).

Additionally, as shown in FIG. 3, in some embodiments, the tubular structure stability system 300 may include at least one damper system 1000 having one or more dampers and slide arrangements between respective pillars 22 and tubes 14 to adjust for imposed lateral forces in direction 310 and/or longitudinal forces in direction 315 (e.g., due to forces caused by the capsule movement, thermal considerations, and/or seismic events). In certain embodiments, the tubes 14 may be fixed to the dampening system 1000, and the dampening system 1000 is supported by pillars 22. In some embodiments, the pillars 22 and the dampening system 1000 are structured and arranged to constrain the tubes 14 in a vertical direction (i.e., direction 320) while allowing for relative longitudinal (i.e., direction 315) and lateral movement (i.e., direction 310) of the tube 14 relative to a respective pillar 22.

In additional embodiments, the damper system 1000 may also include a vertical damper (not shown) to adjust for vertical forces in vertical direction 320 (e.g., due to forces caused by the capsule movement, thermal considerations, and/or seismic events). Some embodiments may also allow for some movement in the vertical direction between the pillars 22 and the tubes 18, 20, and/or between the pillar and the ground. In addition, in accordance with aspects of the disclosure, the position of the pillar-to-tube connection may be adjustable vertically and/or laterally, for example, to ensure proper alignment of the tube, and/or to provide for a smoother ride.

As shown in FIG. 3, in some embodiments, the expansion joint 500 may be arranged along a transportation tube 14 at a distance 305 from a pillar 22. In certain embodiments, the distance 305 may be located a distance from a respective pillar 22 along the tube 14 that has a minimum moment point. In other contemplated embodiments, distance 305 may be approximately zero (e.g., an expansion joint 500 is arranged approximately adjacent to a damper system 1000). In other embodiments, the expansion joint 500 may be arranged anywhere along the tube 14. In further embodiments of the present disclosure, expansion (or slip) joints may be provided at each station (or, e.g., approximate to each station), or at positions between stations, to adjust for tube length variance due to, for example, thermal expansion.

Figure 4:
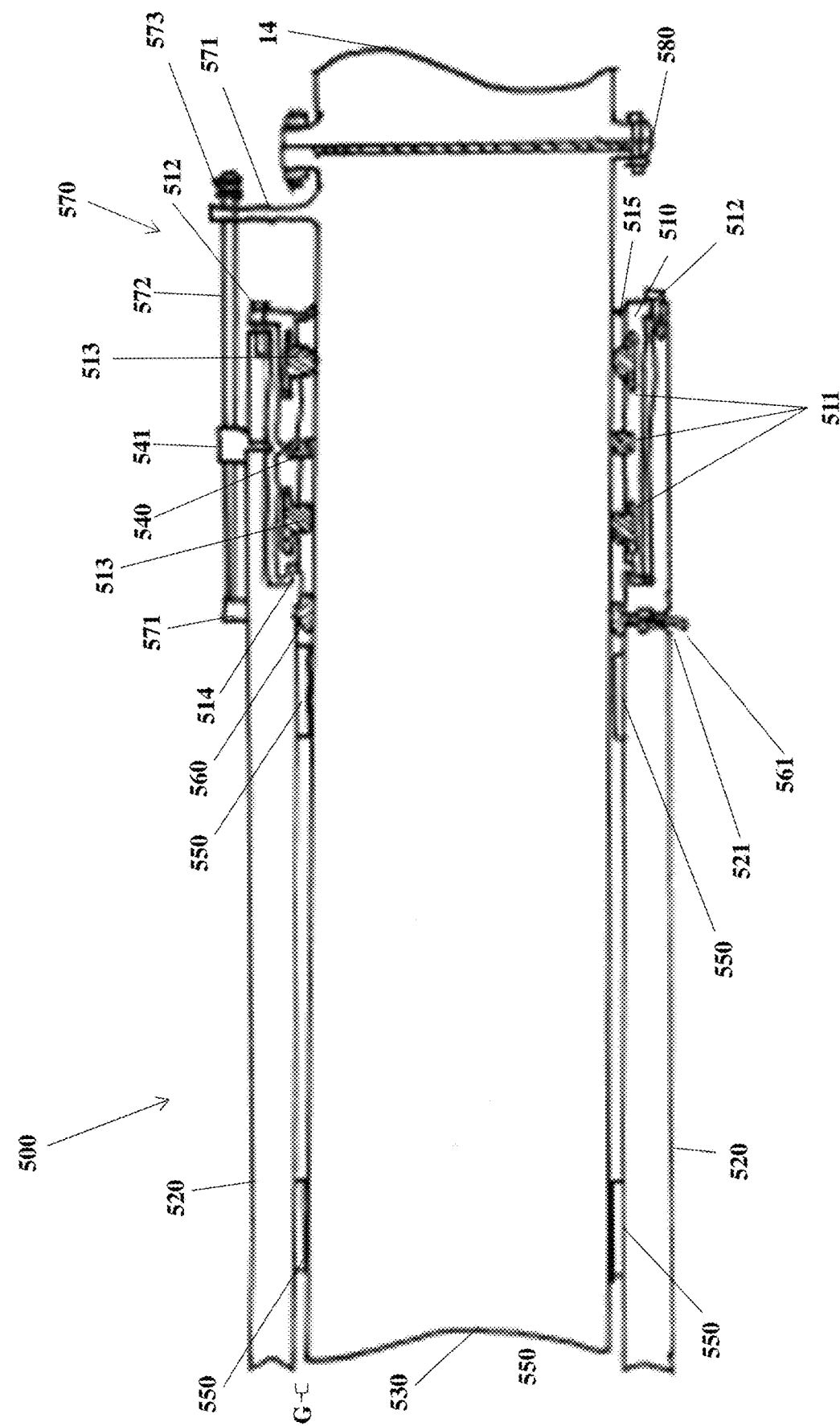
FIG. 4 illustrates a schematically-depicted sectional view of an exemplary expansion joint in accordance with aspects of the present disclosure.

FIG. 4 shows a schematic section view of an exemplary slip-style expansion joint 500 in accordance with aspects of the present disclosure. With this exemplary and non-limiting embodiment of FIG. 4, the expansion joint 500 includes an O-ring sled 510 that is removably attached to an end of an exterior tube 520, and an interior tube 530 including a portion disposed within an end of the O-ring sled 510 and the end of the exterior tube 520. The interior tube 530 may be connected to the enclosed structure 14 of the transportation system via a flanged connection 580. An end of the O-ring sled 510 is attached to the end of the exterior tube 520 via at least one fastener 512, which may include one or more bolts that are fixed to respective bore holes of the exterior tube 520. The exterior tube 520 and the interior tube 530 may comprise a hardened metal material, such as carbon steel. It should be understood, however, that the material is not limited to metals and may comprise any material suitable to maintain the pressure and load forces required for operation of the transportation system. In embodiments, the exterior tube 520 and the interior tube 530 may comprise substantially the same materials. In other embodiments, the exterior tube 520 and the interior tube 530 may comprise at least some different materials.

As shown in FIG. 4, a plurality of tubular low-friction sliding pads 550 (e.g. two or more) are disposed on an inner circumferential surface of the exterior tube 520. The low-friction sliding pads 550 support an outer circumferential surface of the interior tube 530, maintain a gap G between the inner circumferential surface of the exterior tube 520 and the outer circumferential surface of the interior tube 530, and allow the interior tube 530 to slide longitudinally, e.g., due to thermal expansion and/or contraction forces, with respect to the exterior tube 520. In embodiments, the low-friction sliding pads 550 provide a low friction surface such that a coefficient of friction between the low-friction sliding pads 550 and the interior tube 530 is lower than a coefficient of friction between the exterior tube 520 and the interior tube 530. Because the end of the interior tube 530 is vertically supported by the low-friction sliding pads 550 of the exterior tube 520, the expansion joint 500 may by disposed anywhere along the transportation system. For example, an exemplary expansion joint 500 may be disposed at locations along the transportation system that are not supported by pylons.

In some embodiments, two tubular low-friction sliding pads 550 may be arranged at the inner circumferential surface of the exterior tube 520 and may be spaced apart by a predetermined distance. In embodiments, at least one displacement controller 570 (described below) may be provided to limit longitudinal displacement between the exterior tube 520 and the interior tube 530 such that an end of the interior tube 530 remains in contact with each low-friction sliding pad 550. According to this arrangement, the two tubular low-friction sliding pads 550 may support an end of the interior tube 530 and may resist bending moments resulting from supporting the vertical load of the end of the interior tube 530, thereby obviating the need for an independent vertical support structure (e.g., a pylon) at the expansion joint 500.

In embodiments, the O-ring sled 510 may form a tubular shape having an inner circumferential diameter that is larger than an outer circumferential diameter of the interior tube 530. In embodiments, the O-ring sled 510 may be arranged in several segments (described below), e.g., two halves split axially, which can be disassembled and attached sequentially. According to such exemplary and non-limiting embodiments, the O-ring sled 510 may be removed from the interior of the exterior tube 520 and the segments of the O-ring sled 510 may be disassembled from the interior tube 530. By disassembling the O-ring sled 510 in this exemplary and non-limiting manner and by activating a selectively engageable service seal 560 (described below), the O-ring sled 510 may be removed from the transportation system and serviced while preserving functionality of the expansion joint 500. Thus, according to aspects of the disclosure the removable O-ring sled 510 may reduce service disruptions, improve the manufacturability and life span, and facilitate maintenance of the transportation system.

As shown in FIG. 4, a plurality of grooves 511 are each disposed on the inner circumferential surface of the O-ring sled 510. With an exemplary and non-limiting embodiment, the O-ring sled 510 may include at least one sealing O-ring 513 disposed in a respective one of the plurality of grooves 511. In embodiments, the O-ring sled 510 may further include at least one interfacial O-ring 514 arranged at an interface of an end of the O-ring sled 510 and the inner circumferential surface of the exterior tube 520.

The at least one sealing O-ring 513 and the at least one interfacial O-ring 514 contact the outer circumferential surface of the interior tube 530 and may together maintain a pressure seal between the exterior tube 520 and the interior tube 530 such that the pressure within the expansion joint 500 may be maintained at a predetermined interior pressure. In embodiments, the at least one interfacial O-ring 514 may include at least two interfacial O-rings (not shown) that seal the interior of the exterior tube 520, reduce the risk of seal failure, and reduce the risk of degradation of the predetermined interior pressure. In embodiments, the predetermined interior pressure may be any pressure less than 1 atmosphere at sea level and may approach a vacuum. In embodiments, the expansion joint 500 may seal a pressure gradient between an interior and an exterior of the expansion joint 500 of up to one 1 atmosphere at sea level.

As shown in FIG. 4, the at least one sealing O-ring 513 may be a "T-style" O-ring with the cross of the "T" disposed within a groove 511 of the O-ring sled 510. The "T-style" O-rings may resist torsional twisting, and thus help to maintain the at least one sealing O-ring 513 within the groove 511 as the at least one sealing O-ring 513 is subjected to longitudinal forces resulting from friction between the at least one sealing O-ring 513 and the outer circumferential surface of the interior tube 530 as the interior tube 530 slides with respect to the exterior tube 520. In embodiments, the O-ring sled 510 may include at least two sealing O-rings 513 disposed between the at least one interfacial O-ring 514 and at least one scraper 515 (described below). In embodiments, packing material, including for example a viscous fluid, such as oil or grease, may be used in conjunction with the at least one sealing O-ring 513 and the at least one interfacial O-ring 514 to further seal the expansion joint 500.

As is further depicted in FIG. 4, in an exemplary and non-limiting embodiment according to aspects of the disclosure the O-ring sled 510 may include at least one lubricator 540 disposed in a respective one of the plurality of grooves 511. The at least one lubricator 540 may contact the outer circumferential surface of the interior tube 530 and may provide a lubricant, such as e.g., polytetrafluoroethylene, that lubricates the at least one sealing O-ring 513 and the at least one interfacial O-ring 514 to facilitate the sliding of the interior tube 530 with respect to the exterior tube 520. The at least one lubricator 540 may comprise, e.g., a felt and/or sponge material that distributes the lubricant along the outer circumferential surface of the interior tube 530. In embodiments, the at least one lubricator 540 may be periodically supplied with lubricant. In embodiments, the exterior tube 520 may include a drip-type lubrication reservoir 541 on the outer circumferential surface that drips the lubricant from the lubrication reservoir 541, through the outer circumferential surface of the exterior tube 520, and to the lubricator 540. In embodiments, the lubricator 540 may be disposed between two sealing O-rings 513; however, the position of the lubricator is not limited to this arrangement and lubricators 540 may be disposed to either or both sides of any sealing O-ring 513 arranged in the O-ring sled 510. In embodiments, the lubrication reservoir 541 may be pressurized.

As depicted in FIG. 4, in accordance with exemplary and non-limiting aspects of the present disclosure the O-ring sled 510 may include at least one scraper 515 disposed in a respective one of the plurality of grooves 511. The at least one scraper 515 may be disposed adjacent to an opening of the O-ring sled 510. The at least one scraper 515 may contact and be substantially flush with the outer circumferential surface of the interior tube 530 to prevent foreign materials from entering the O-ring sled 510. The at least one scraper 515 may comprise a hard rubber or any other material with similar properties suitable for preventing foreign materials from penetrating beyond the at least one scraper 515 and between the interior tube 530 and the O-ring sled 510.

FIG. 4 further illustrates an exemplary embodiment of the selectively engageable service seal 560 that allows for removal and maintenance of the O-ring sled 510 without the need to shutdown operation of the transportation system and the drawbacks associated therewith. In embodiments, the service seal 560 may be disposed on the inner circumferential surface of the exterior tube 520. The service seal 560 may be disposed further within an interior of the exterior tube 520 than the O-ring sled 510 and may selectively provide a pressure-tight seal between the outer circumferential surface of the inner tube 530 and the inner circumferential surface of the exterior tube 520. The service seal 560 may be an inflatable seal having an inflation valve 561 that provides fluid access to the service seal 560 through a vacuum seal pass-through 521 of the exterior tube (described in further detail below). In embodiments, the vacuum seal pass-through 521 may include at least one, two, or more redundant seals (not shown) that seal the interior of the exterior tube 520, reduce the risk of seal failure, and reduce the risk of degradation of the predetermined interior pressure. In embodiments, the service seal 560 may include a seal comprised of hard rubber, and/or other suitable material, that may be engaged by operation of a mechanical lever mechanism (not shown). In accordance with aspects of the present disclosure, the service seal 560 may be selectively engaged to permit removal of the O-ring sled 510 from the transportation system without loss of pressure within the transportation system.

As shown in FIG. 4, at least one displacement controller 570 may be arranged on the outer circumferential surfaces of the exterior tube 520 and the interior tube 530, which limits longitudinal displacement between the exterior tube 520 and the interior tube 530. The displacement controller 570 may include control rod plates 571, arranged substantially parallel to each other on a respective one of the outer circumferential surface the exterior tube 520 and the interior tube 530, and at least one control rod 572 connected to each control rod plate 571. In embodiments, at least one nut 573 may be provided at at least one end of the at least one control rod 572 and the at least one nut 573 may be adjusted to define the maximum longitudinal displacement between the exterior tube 520 and the interior tube 530. In embodiments, the maximum longitudinal displacement allowed by the at least one displacement controller 570 may be 1.5 meters, or up to 1.7 meters.

According to aspects of the present disclosure (not shown), the transportation system may include at least three control rods 572 disposed around an outer circumference of the expansion joint 500. In embodiments, ends of the at least three control rods 572 may be respectively attached to a plurality of distinct control rod plates 571 provided at locations around each respective exterior tube 520/interior tube 530. In further embodiments, the control rod plates 571 may be provided continuously around the circumference of each respective exterior tube 520/interior tube 530.

Figure 5:
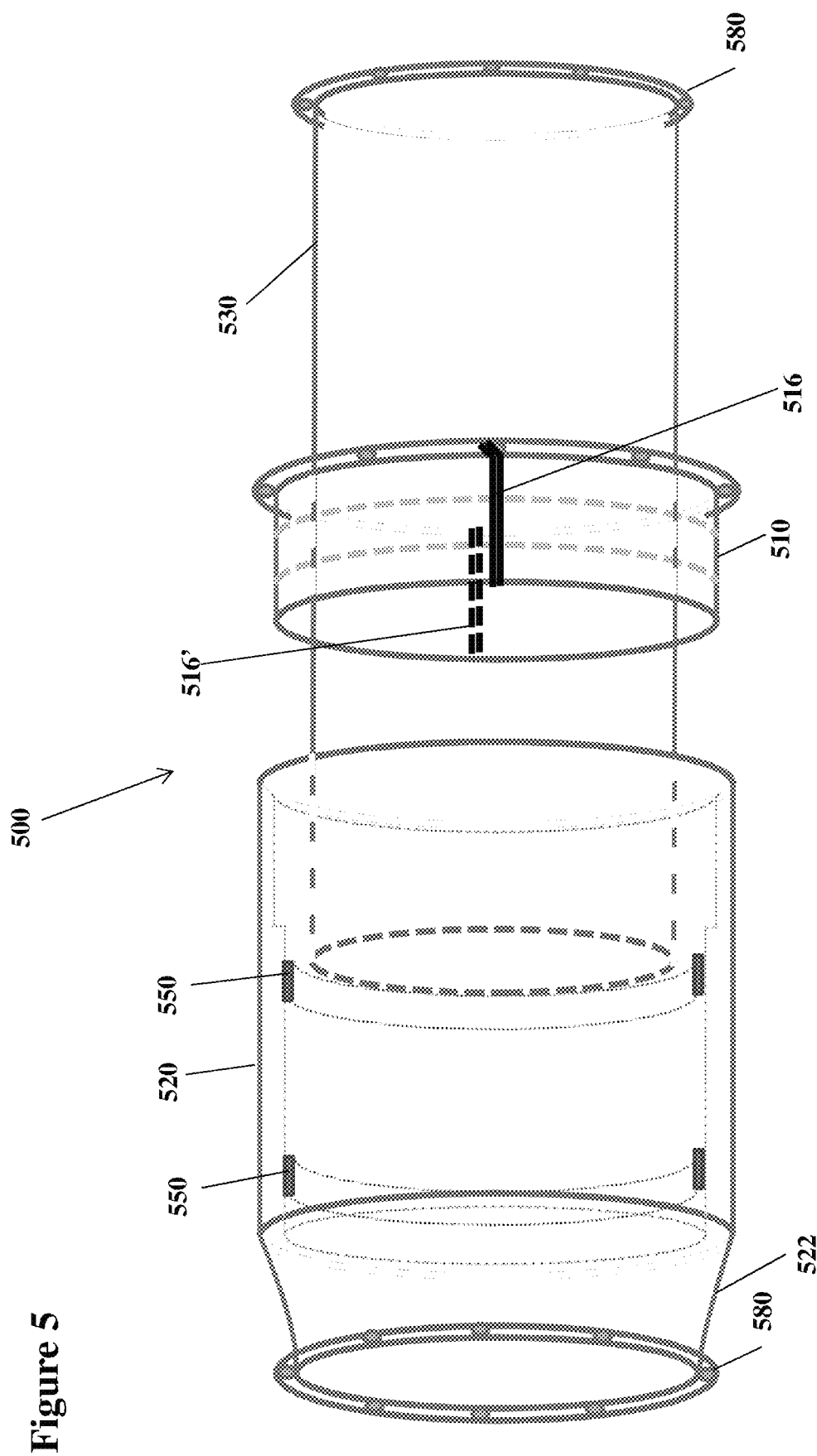
FIG. 5 illustrates an exploded schematically-depicted perspective view of an exemplary expansion joint in accordance with aspects of the present disclosure.

FIG. 5 illustrates an exploded schematically-depicted perspective view of the slip-style expansion joint 500 in accordance with aspects of the present disclosure, including exemplary schematic depictions of the O-ring sled 510 split into two halves axially at junctions 516, 516', the exterior tube 520 having low-friction sliding pads 550, and the interior tube 530. In embodiments in accordance with aspects of the present disclosure, the two halves of the O-ring sled 510 may be removably joined together the junctions 516, 516' via a mechanical clamp (not shown) provided around an outer circumference of the O-ring sled 510. In further embodiments, the two halves of the O-ring sled 510 may be removably joined together the junctions 516, 516' via fasteners (not shown), e.g., bolts, provided at ends of the O-ring sled 510. In embodiments, pins (now shown) may be provided at the junctions 516, 516' for alignment of the two halves of the O-ring sled 510. It should be noted that the circumferences of the low-friction sliding pads 550 and the interior tube 530 shown schematically in FIG. 5 are not drawn proportionally to each other to allow for a more detailed depiction of the interior of the exterior tube 520. That is, it should be understood that respective circumferences the low-friction sliding pads 550 and the interior tube 530 are substantially the same to allow the low-friction sliding pads 550 to contact and support the interior tube 530, as discussed above.

According to an exemplary embodiment, flanged connections 580 are provided at each end of the expansion joint 500, which may connect the expansion joint 500 to enclosed structures (e.g., tubes) of the transportation system. Further, the exterior tube 520 may include a taper 522 from a body of the exterior tube 520 to an end of the exterior tube 520 opposite to the end of the exterior tube 520 that is structured to receive the O-ring sled 510 and the interior tube 530. In embodiments, the exterior tube 520 may taper to the opposite end of the exterior tube 520 such that the opposite end may have a circumference equal to both a circumference of the interior tube 530 and a circumference of enclosed structures (e.g., tubes) of the transportation system to facilitate connection of the expansion joint 500 to the transportation system and/or to minimize critical points for stress.

In yet another embodiment (not shown), the exterior tube 520 may have equal circumferences at both ends, and the circumferences of the exterior tube 520 may be equal to that of the circumference of ends of and the enclosed structures of the transportation system. According to this embodiment, the interior tube 530 may taper at an end thereof to fit within the exterior tube 520.

Figure 6:
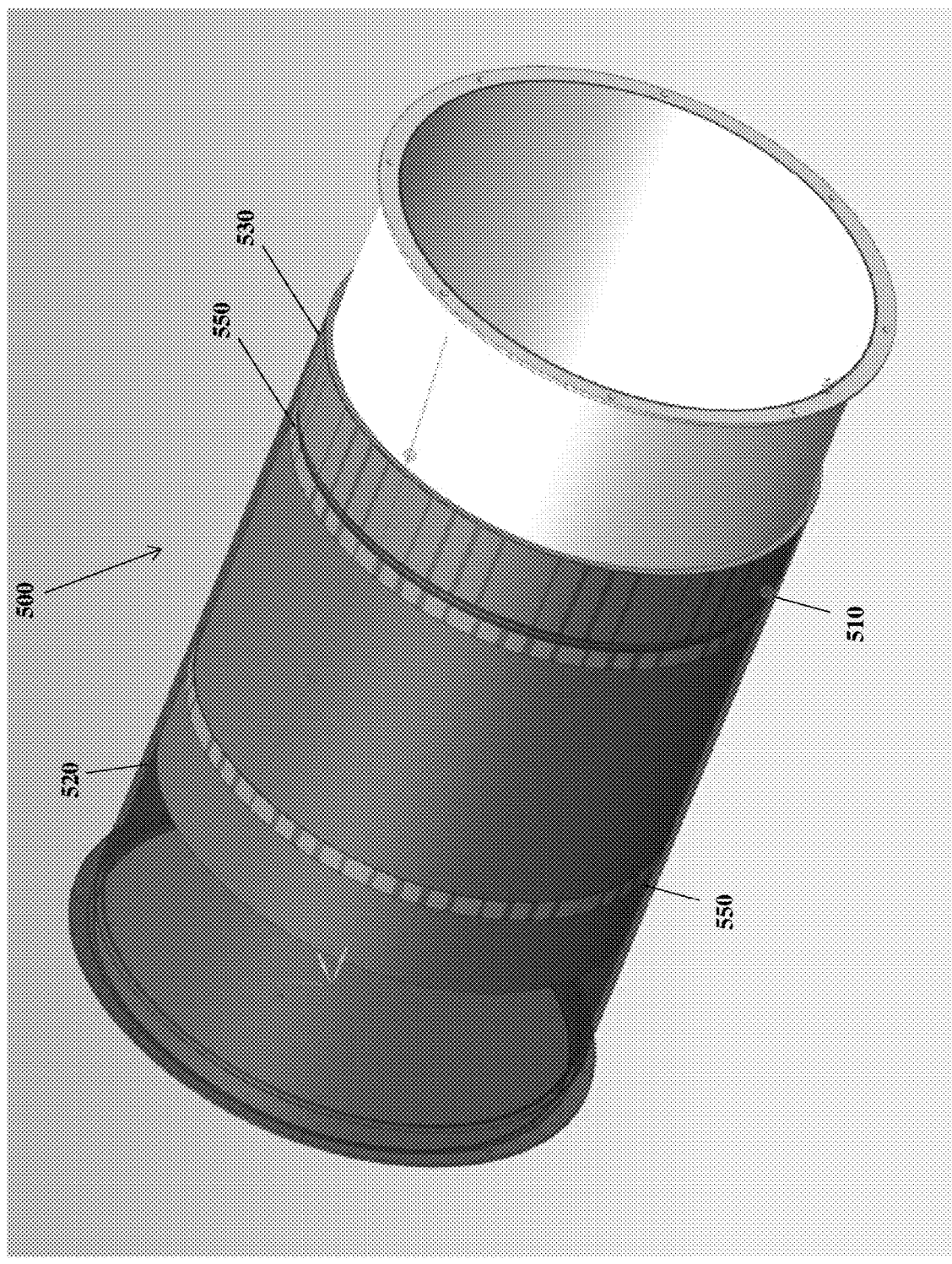
FIG. 6 illustrates a schematically-depicted perspective view of an exemplary expansion joint in accordance with aspects of the present disclosure.

FIG. 6 illustrates a schematically-depicted perspective view of an exemplary expansion joint 500 in accordance with aspects of the present disclosure. As shown in FIG. 6, the expansion joint 500 may include the removable O-ring sled 510, the exterior tube 520, the at least two low-friction sliding pads 550, and the interior tube 530. FIG. 6 further provides an exemplary sense of the relative scale of the removable O-ring sled 510, the exterior tube 520, the at least two low-friction sliding pads 550 low-friction, and the interior tube 530 in accordance of aspects of the present disclosure.

Figure 7:
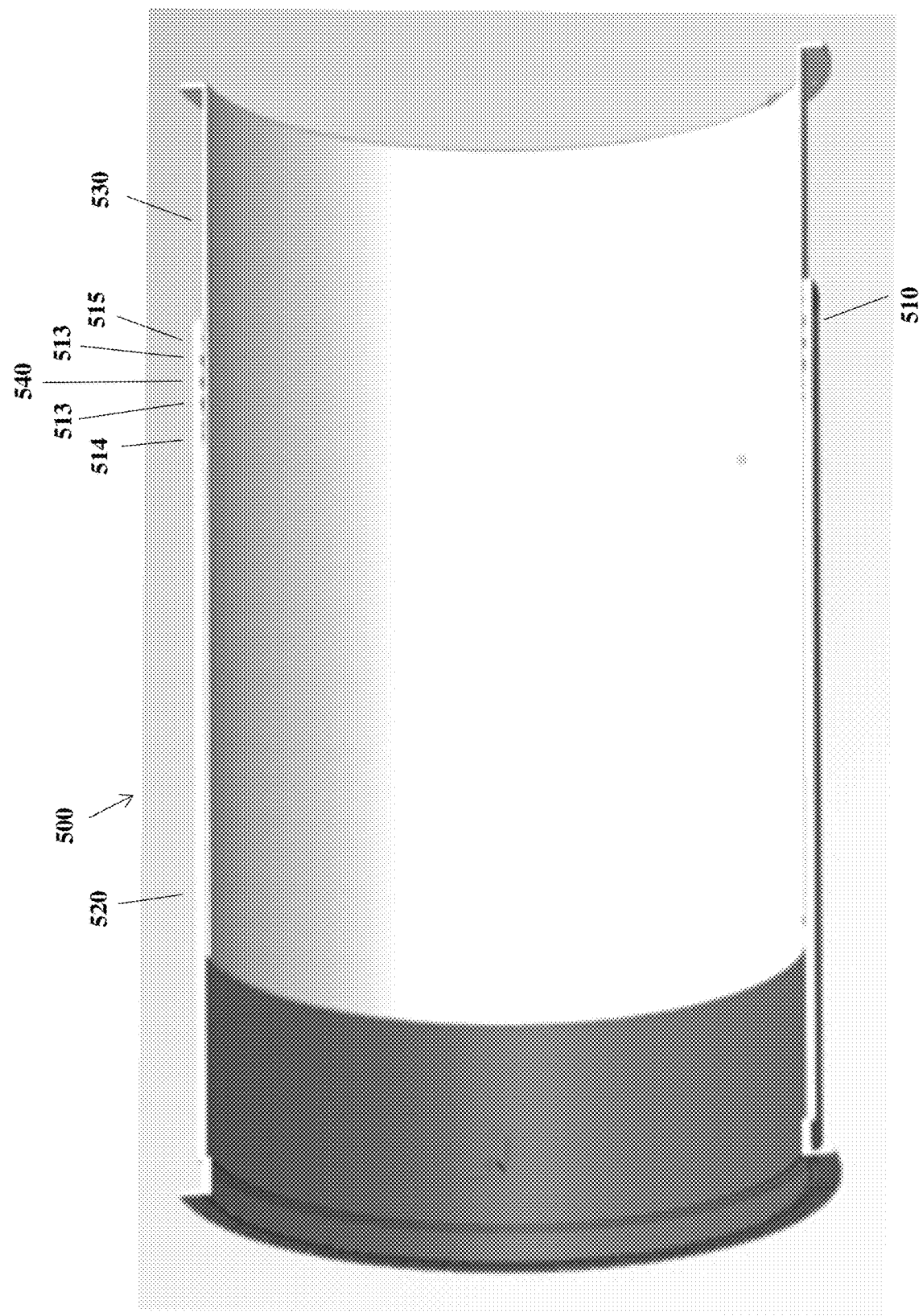
FIG. 7 illustrates a cut-away schematically-depicted sectional view of an exemplary expansion joint in accordance with aspects of the present disclosure.

FIG. 7 illustrates a cut-away schematically-depicted sectional view of the slip-style expansion joint 500 in accordance with aspects of the present disclosure. As shown in FIG. 7, the expansion joint 500 may include the removable O-ring sled 510, the exterior tube 520, and the interior tube 530. In embodiments, the O-ring sled 510 may include the at least one interfacial O-ring 514, the at least two sealing O-rings 513, the at least one lubricator 540, and the at least one scraper 515. FIG. 7 further provides an exemplary sense of the relative scale of the removable O-ring sled 510, including the above-listed components thereof, the exterior tube 520, and the interior tube 530 in accordance of aspects of the present disclosure.

Figure 8:
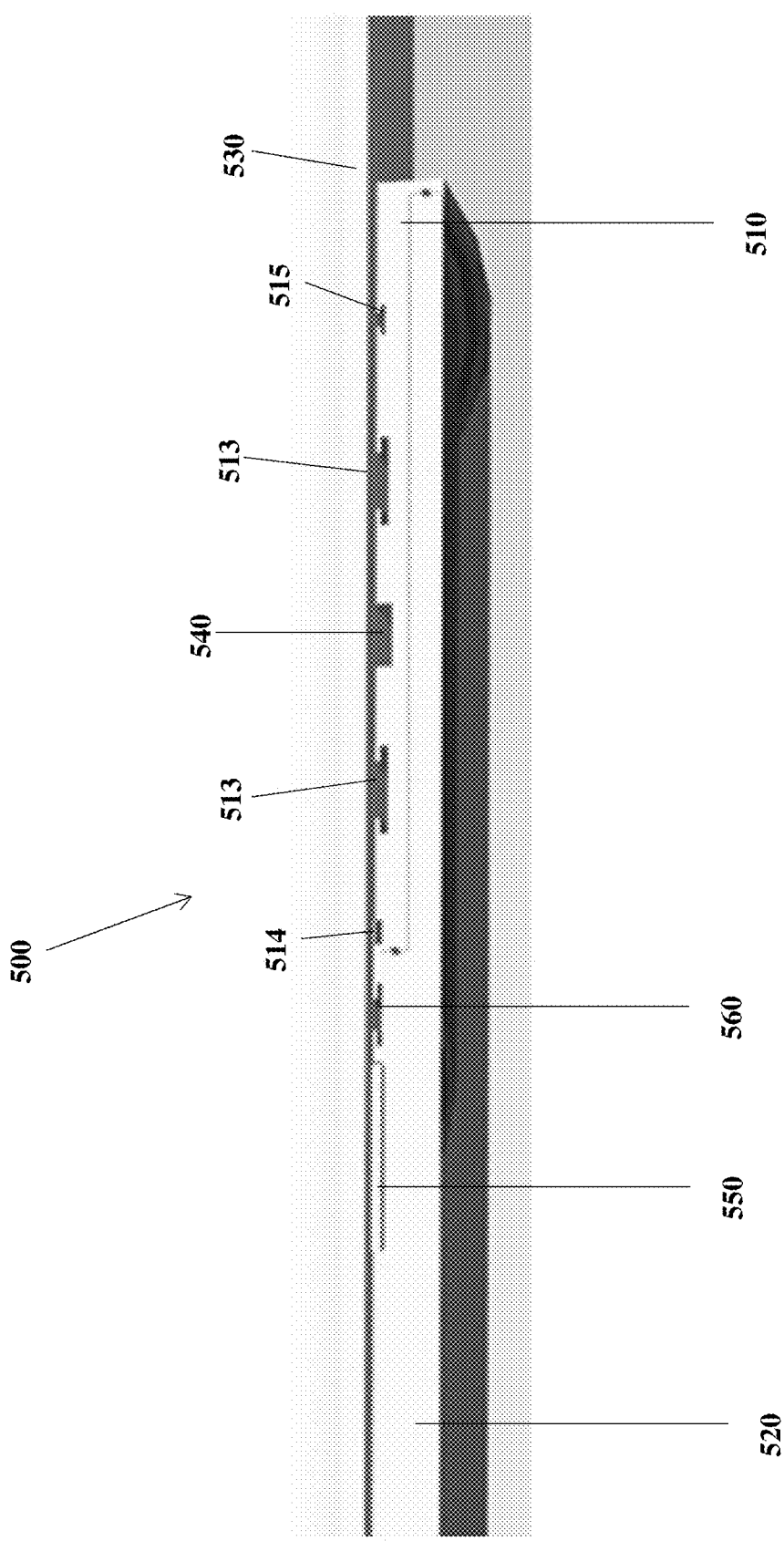
FIG. 8 illustrates an enlarged schematically-depicted sectional view of an exemplary expansion joint shown in accordance with aspects of the present disclosure.

FIG. 8 illustrates an enlarged schematically-depicted sectional view of the slip-style expansion joint 500 in accordance with aspects of the present disclosure. In embodiments, the O-ring sled 510 may include the at least one interfacial O-ring 514, the at least two sealing O-rings 513, the at least one lubricator 540, and the at least one scraper 515. As shown in FIG. 8, the O-ring sled 510 may be disposed within the exterior tube 520 and between the interior tube 530. In embodiments, the low-friction sliding pad 550 and the service seal 560 may be disposed longitudinally further within the interior of the exterior tube 520 than removable O-ring sled 510, which may thereby permit functionality of the expansion joint 500 after the O-ring sled 510 has been removed for servicing, as discussed below.

Figure 9:
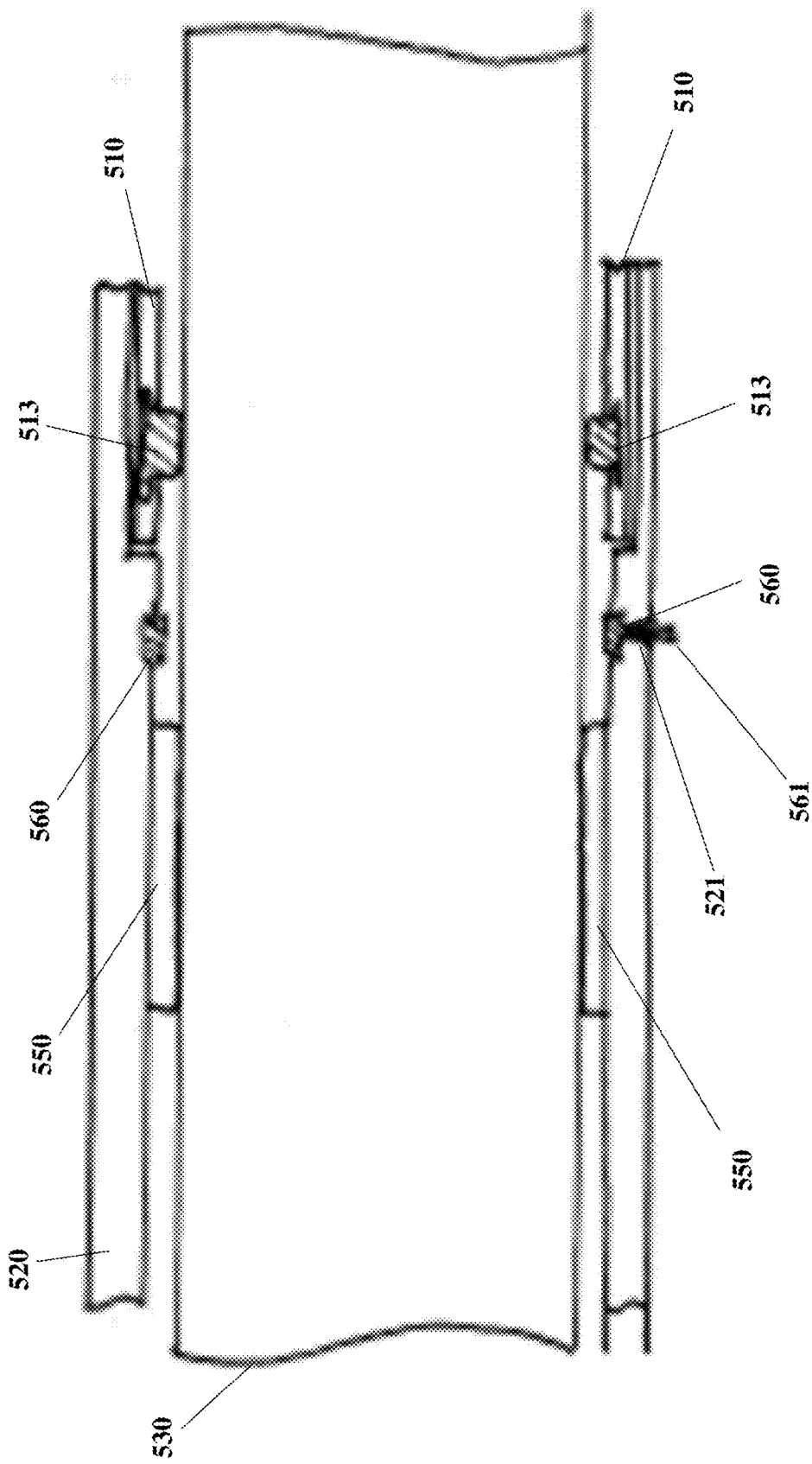
FIG. 9 illustrates a schematically-depicted sectional view of an exemplary expansion joint with an exemplary inflatable service seal in a deflated state in accordance with aspects of the present disclosure.

FIG. 9 illustrates a schematically-depicted view of an exemplary embodiment of an inflatable service seal 560, in a deflated state, of the slip-style expansion joint 500 according to aspects of the present disclosure. In aspects of the present disclosure, the inflatable service seal 560 may seal the expansion joint 500, independently from the seal provided by the O-ring sled 510, and may therefore allow for maintenance of the O-ring sled 510 without the need to shutdown operation of the transportation system. According to this exemplary embodiment, the inflatable service seal 560 is arranged, in a longitudinal direction of the exterior tube 520, between a low-friction sliding pad 550 of the exterior tube 520 and a sealing O-ring 513 of the O-ring sled 510. In embodiments, the inflation valve 561 may be provided through the vacuum seal pass-through 521 of the exterior tube 520 to allow the inflatable service seal 560 to inflate from the deflated state. The inflatable service seal 560 may therefore selectively provide a pressure-tight seal between the exterior tube 520 and the interior tube 530 that is independent from the pressure-tight seal created by the removable O-ring sled 510.

Figure 10:
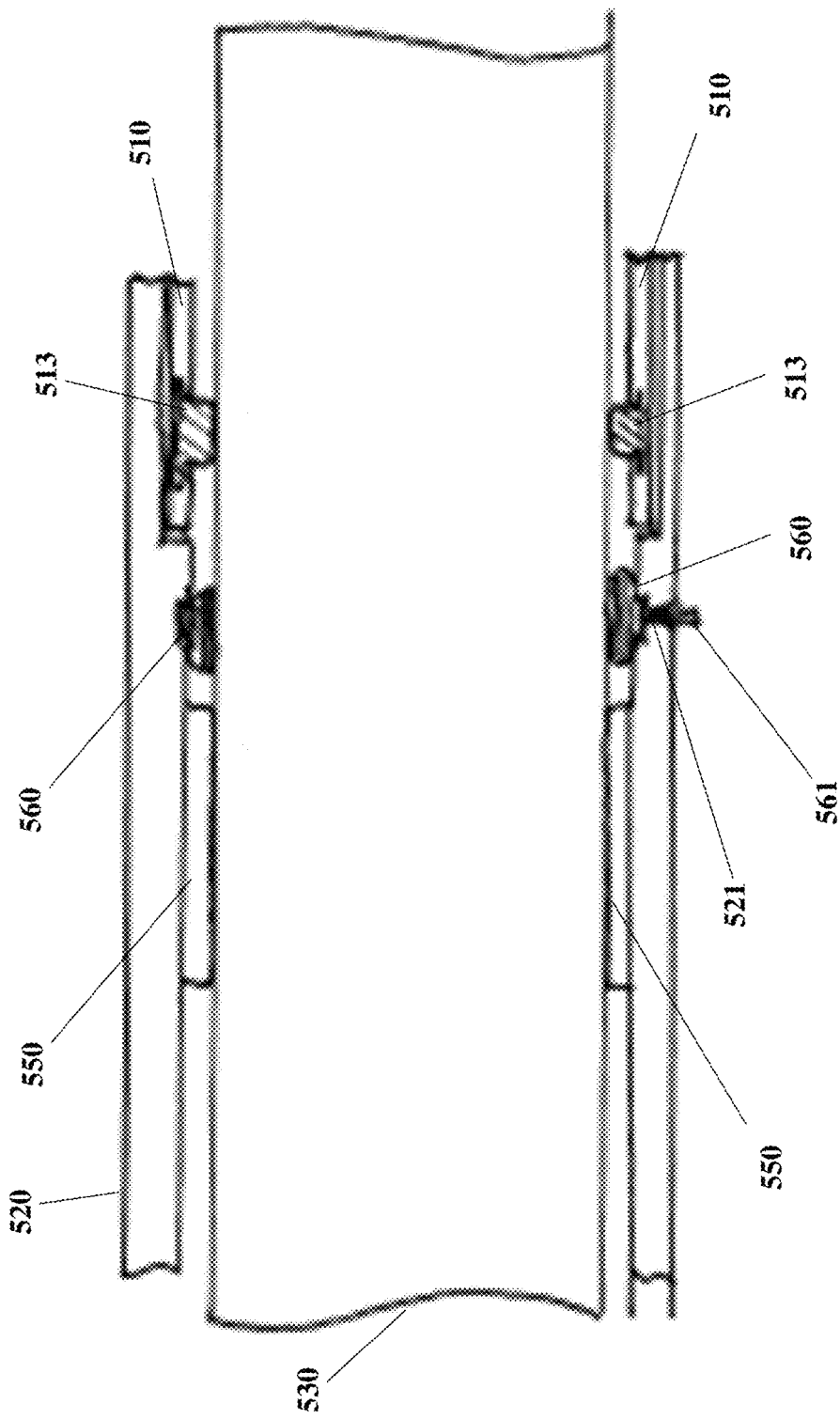
FIG. 10 illustrates the exemplary inflatable service seal shown in FIG. 9 in an inflated state in accordance with aspects of the present disclosure.

FIG. 10 illustrates a schematically-depicted view of the exemplary embodiment of an inflatable service seal 560 shown in FIG. 9, after the inflatable service seal 560 has been inflated to an inflated state, according to aspects of the present disclosure. As shown in FIG. 10, in the inflated state the service seal 560 may directly contact the interior tube 530 to provide the independent pressure-tight seal between the exterior tube 520 and the interior tube 530.

Figure 11:
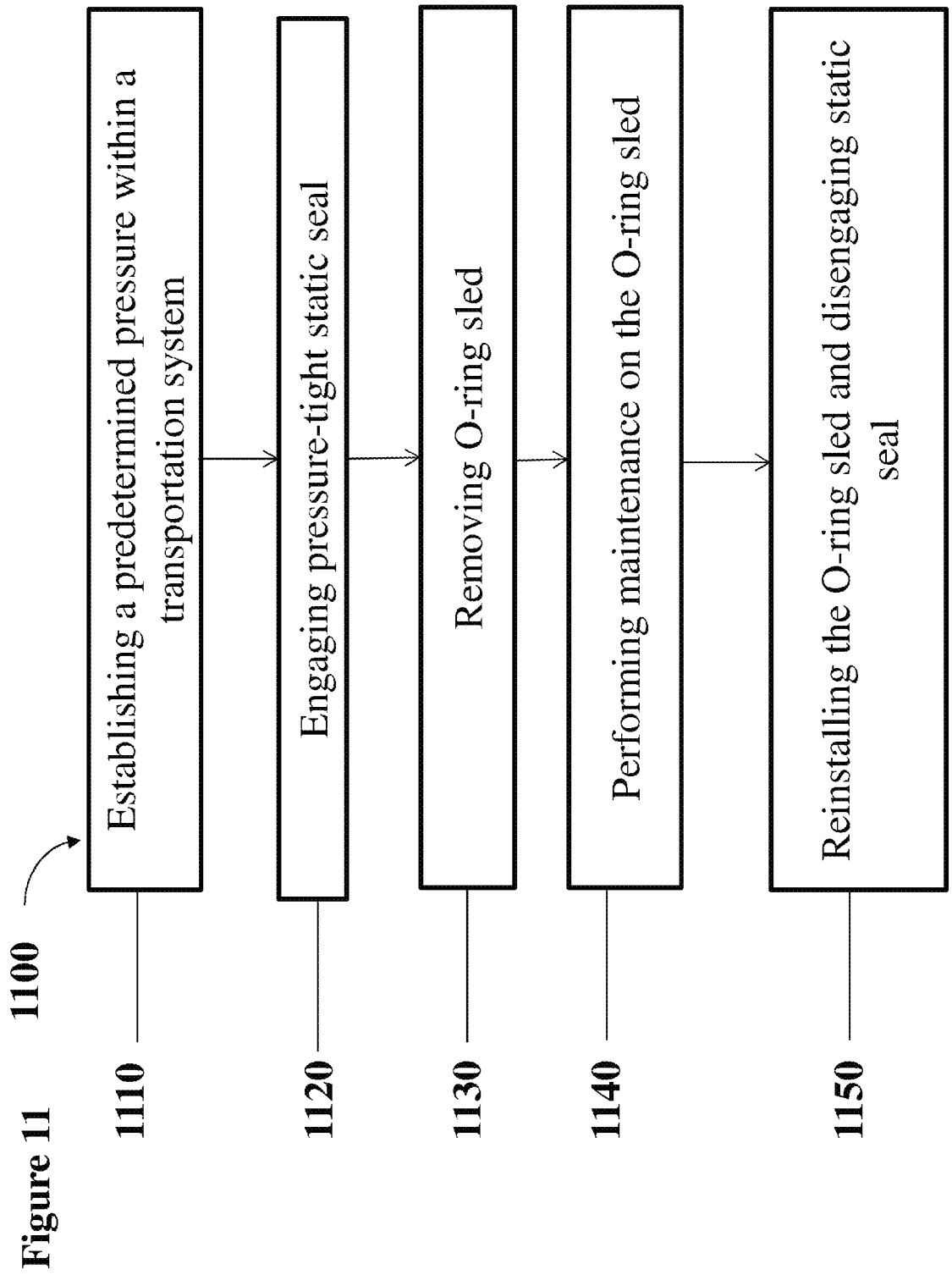
FIG. 11 illustrates an exemplary process for continuous operation of a transportation system in accordance with aspects of the present disclosure.

FIG. 11 shows a method for continuous operation 1100 of the transportation system having a service seal and a slip-style expansion joint in accordance with aspects of the present disclosure. The method for continuous operation 1100 of the transportation system allows for maintenance of the expansion joint without losing pressure within the transportation system and without the costs associated with a shutdown of the system. As shown in the exemplary method of FIG. 11 at step 1110, a user establishing a predetermined pressure, e.g., a less than 1 atmosphere at sea level, within an interior of the transportation system. At step 1120, the user may engage the service seal with the interior tube to provide a pressure tight seal, independent from the pressure-tight seal provided by the O-ring sled, between the exterior tube and the interior tube. At step 1130, the user may remove the O-ring sled from the expansion joint while the service seal maintains the interior of the transportation system at the predetermined pressure. At step 1140, the user may perform maintenance on the O-ring sled, which may include, e.g., repair and/or replacement of any combination of the least one sealing O-ring, the least one interfacial O-ring, the least one scraper, the least one lubricator, and/or the plurality of grooves. At step 1150, the user may reinstall the O-ring sled on the expansion joint and thereafter disengage the service seal, such that the O-ring sled again maintains the interior of the transportation system at the predetermined pressure. According to aspects of the disclosure, the user may perform any combination of the steps of the method for continuous operation 1100 of the transportation system manually or via automated processes.

Figure 12:
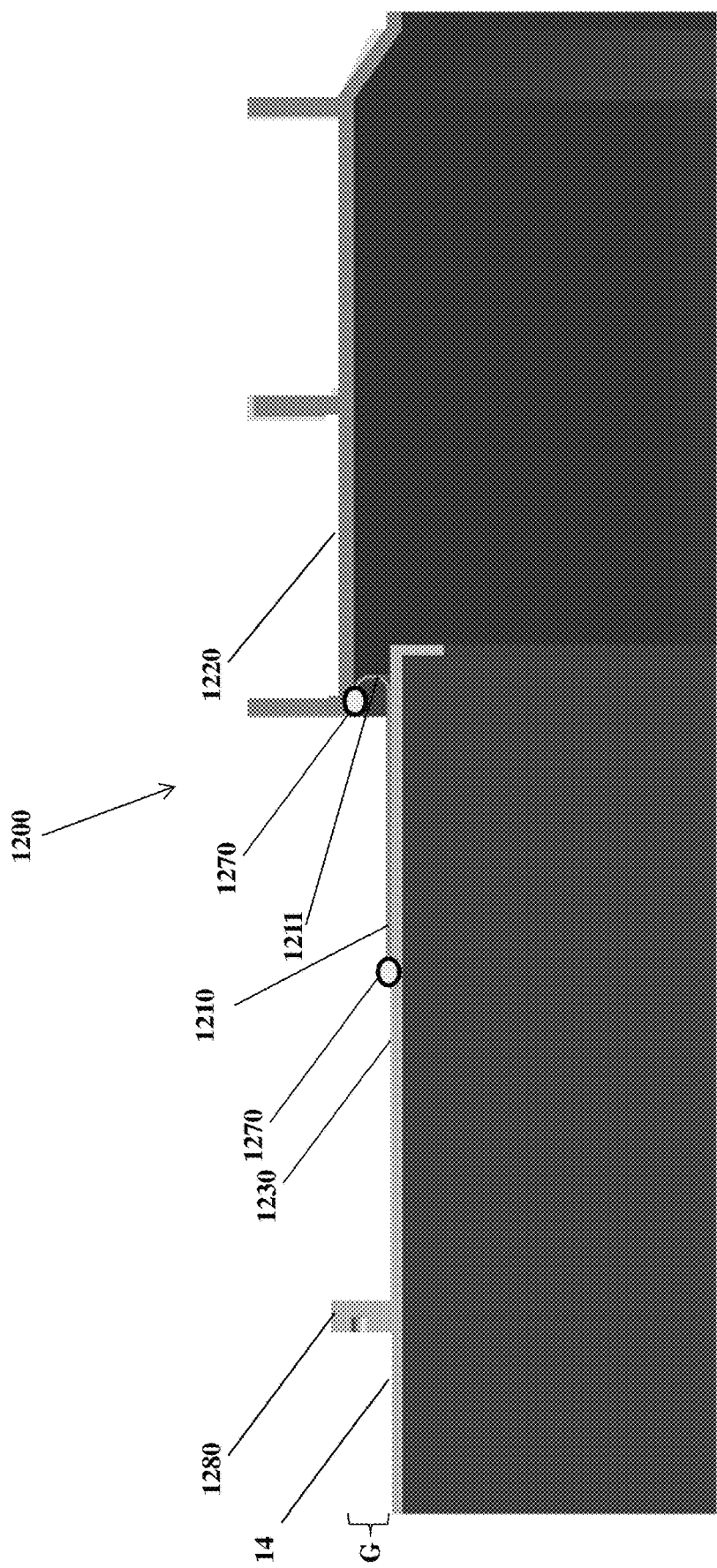
FIG. 12 illustrates a partial schematically-depicted sectional view of another exemplary expansion joint in accordance with aspects of the present disclosure.

FIG. 12 shows a partial schematically-depicted sectional view of an exemplary slip-style expansion joint 1200 in accordance with aspects of the present disclosure. As shown in the exemplary embodiment of FIG. 12, the expansion joint 1200 includes a rolling seal belt 1210, an exterior tube 1220, and an interior tube 1230 including a portion that is disposed within the rolling seal belt 1210 and within an opening of the exterior tube 1220. According to aspects of the disclosure, the exterior tube 1220 and the interior tube 1230 may be vertically supported via, for example, pylons (not shown) disposed apart from each other in a longitudinal direction of the transportation system. In embodiments, the pylons may be separately attached to each of the respective tubes. The exterior tube 1220 and the interior tube 1230 are substantially concentric and the pylons may vertically support the tubes such that a gap G is provided and maintained between an inner circumferential surface of the exterior tube 1220 and an outer circumferential surface of the portion of the interior tube 1230 disposed within the exterior tube 1220. In exemplary and non-limiting embodiments, the width of the gap G may be 2 inches, with other widths also being contemplated in accordance with aspects of the present disclosure.

The exterior tube 1220 and the interior tube 1230 may comprise, e.g., a hardened metal material, such as carbon steel. It should be understood, however, that the material is not limited to metals and may comprise any material suitable to maintain the pressure and load requirements of the transportation system. In embodiments, the exterior tube 1220 and the interior tube 1230 may comprise substantially the same materials. In other embodiments, the exterior tube 1220 and the interior tube 1230 may comprise at least some different materials.

As shown in FIG. 12, in exemplary embodiments in accordance with aspects of the present disclosure the interior tube 1230 may be connected to the enclosed structure 14 of the transportation system via a flanged connection 1280. In embodiments, the expansion joint 1200 in accordance with aspects of the present disclosure may be connected to the enclosed structure of the transportation system at least in accordance with any of arrangements previously disclosed herein.

As is further illustrated in FIG. 12, according to aspects of the present disclosure the rolling seal belt 1210 may be a hollow cylindrical shape and may further include a folded portion 1211 at which the rolling seal belt 1210 is folded back upon itself. The folded portion 1211 may be arranged further within the opening of the exterior tube 1220 than a connector 1270 (described below) that connects the rolling seal belt 1210 to the exterior tube 1220. The folded portion 1211 allows the rolling seal belt 1210 to roll upon itself and therefore longitudinally extend and retract up to a predetermined longitudinal distance while maintaining the predetermined pressure within the transportation system. In embodiments, the predetermined longitudinal distance may be 1.5 meters, or up to 1.7 meters. In embodiments, the predetermined interior pressure may be any pressure less than 1 atmosphere at sea level and may approach a vacuum. In embodiments, the expansion joint 1200 may seal a pressure gradient between an interior and an exterior of the expansion joint 1200 of up to one 1 atmosphere at sea level.

Figure 13:
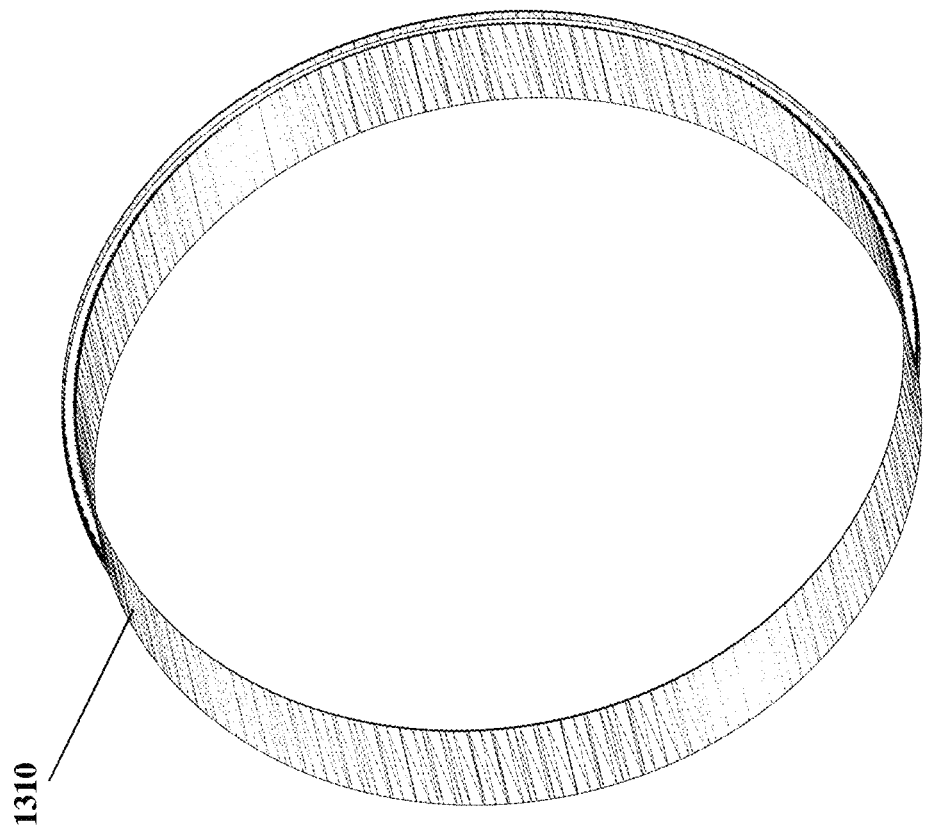
FIG. 13 illustrates an exemplary rolling seal belt in accordance with aspects of the present disclosure.

FIG. 13 depicts an exemplary rolling seal belt 1310 in accordance with aspects of the present disclosure As shown in FIG. 13, the rolling seal belt 1310 may comprise any flexible, non-porous material that configured and arranged to maintain the predetermined pressure of the transportation system 10. In exemplary embodiments, the rolling seal belt 1310 may comprise a unidirectional reinforced rubber, a neoprene elastomer, and/or other suitable materials. According to embodiments of the present disclosure, the rolling seal belt 1310 may be reinforced with a reinforcement material that may comprise a mesh or fabric material to add strength and flexibility to the rolling seal belt 1310, such as nylon, polyester, Kevlar, and/or combinations thereof. As shown in FIG. 13, in embodiments the reinforcement material may be laid in an axial direction that is transverse across the rolling seal belt 1310 such that the rolling seal belt 1310 may expand and contract diametrically. In accordance with aspects of the disclosure, the reinforcement material may limit warping or elongation resulting from a pressure differential across surfaces of the rolling seal belt 1310.

Referring to FIG. 12, in exemplary embodiments ends of the rolling seal belt 1210 are respectively connected to the inner circumferential surface of the exterior tube 1220 and the outer circumferential surface of the interior tube 1230 via connectors 1270. According to aspects of the present disclosure, the rolling seal belt 1210 maintains a pressure-tight seal between the exterior tube 1220 and the interior tube 1230 such that the pressure within the transportation system 10 may be maintained at the predetermined pressure. In embodiments, the connectors 1270 may be a mechanical ring clamp; however, other suitable connectors 1270 may include adhesives, rivets, and/or functional equivalents thereof. In embodiments (not shown), a mechanical ring clamp may be provided around an outer surface of the end of the rolling seal belt in contact with an outside surface to the interior tube.

Figure 14B:
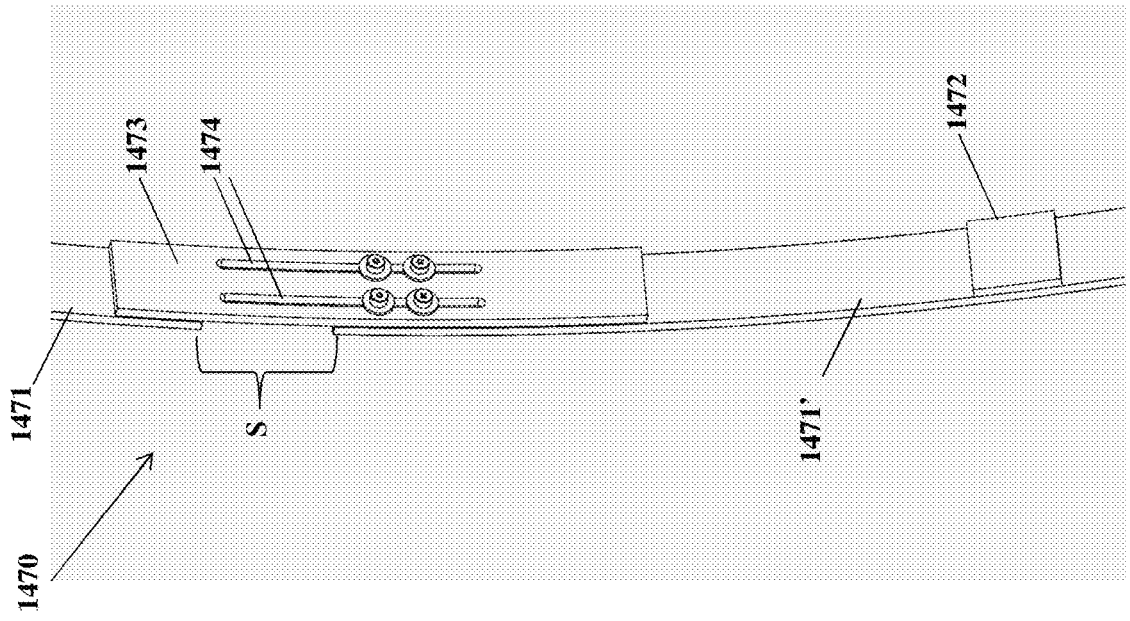
FIG. 14B illustrates a magnified perspective view of an exemplary compression seal in accordance with aspects of the present disclosure.
Figure 14A:
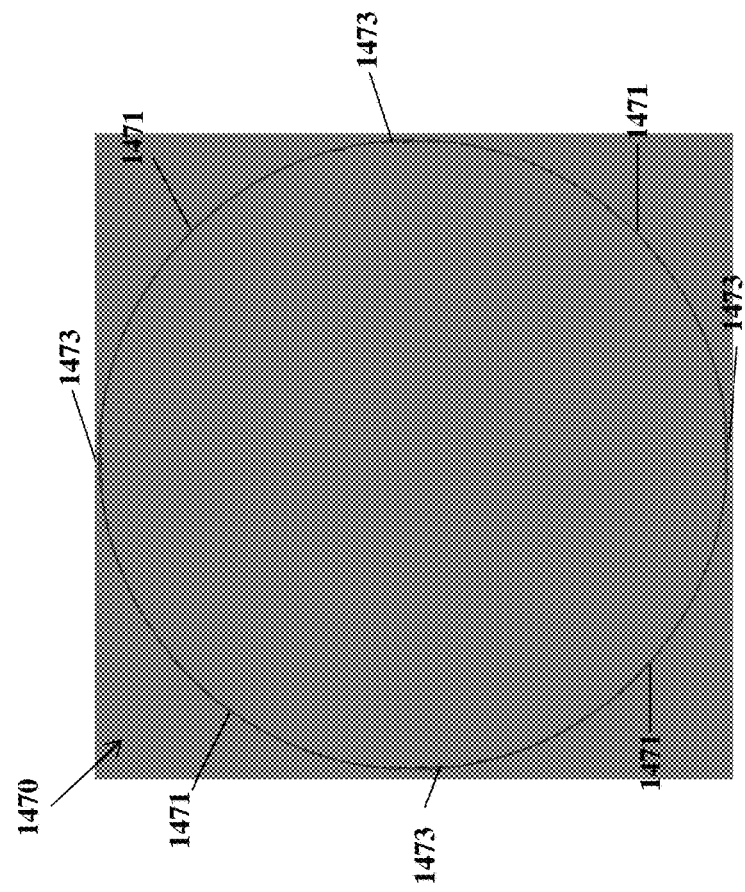
FIG. 14A illustrates an exemplary compression seal in accordance with aspects of the present disclosure.
Figure 14C:
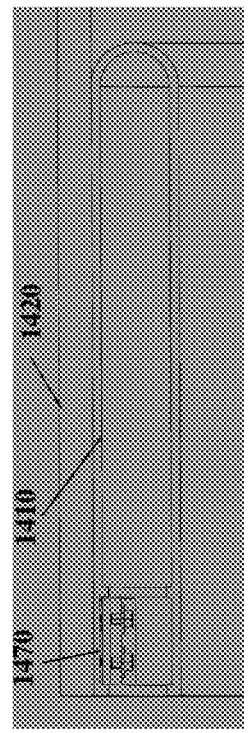
FIG. 14C illustrates a cut away view of an exemplary compression seal in accordance with aspects of the present disclosure.

FIGS. 14A-14C illustrate an embodiment of an exemplary connector 1470 that connects the rolling seal belt 1410 to an inner circumferential surface of the exterior tube 1420 in accordance with aspects of the present disclosure. In an exemplary embodiments, the connector 1470 may include a plurality, e.g., four, arcuate band sections 1471 that each include at least one protruding piece 1472 that protrudes towards an interior formed by the arc-shape of the respective arcuate band section 1471. In embodiments, an inner circumferential surface of ends of adjacent band sections 1471 may be connected via fixing sections 1473 that may include at least two parallel grooves 1474 for bolting the fixing section 1473 to the end of adjacent band sections 1471. In embodiments, the fixing section 1473 may be welded to the band section 1471. In the exemplary embodiment of FIG. 14B, the fixing section 1473 may be welded to an end of one band section 1471 and bolted through the parallel grooves 1474 to another adjacent band section 1471'. In embodiments, both ends of the fixing section 1473 may be bolted to adjacent band sections 1471. In embodiments, after the connector 1470 is installed within the exterior tube 1420, both ends of the fixing section 1473 may be welded to adjacent band sections 1471.

According to aspects of the present disclosure, the exemplary connector 1470 depicted in FIGS. 14A-14C may connect the rolling seal belt 1410 to the inner circumferential surface of the exterior tube 1420 as follows. As shown in FIG. 14A, each of the four band sections 1471 may be connected to each other via fixing pieces 1473. As shown in FIG. 14B, the fixing section 1473 may be welded to an end of one band section 1471 and may be bolted through the parallel grooves 1474 to an adjacent band section 1471. In embodiments, the connector 1470 may define a tubular shape with a circumference that may be adjusted by sliding the bolts along the parallel grooves 1474 of each fixing section 1473.

As shown in cross-section in FIG. 14C, the connector 1470 may be placed inside the inner circumferential surface of the exterior tube 1420 and within an inner circumferential surface of the rolling seal belt 1410 at an end of the rolling seal belt 1410 so as to compress the rolling seal belt 14010 between the exterior tube 1420 and the connector 1470. In embodiments, the connector 1470 may be expanded by applying opposing forces, e.g., such as with a hydraulic press, to the protruding pieces 1472 of adjacent band sections 1471 such that the bolts slide within the grooves 1474 of the fixing piece 1473 and a space S is provided between ends of adjacent band sections 1471. By expanding the connector 1470 within the exterior tube 1420 in accordance with embodiments of the present disclosure, a compression force may be applied to the rolling seal belt 1410 disposed between the connector 1470 and the exterior tube 1420, which may create a pressure-tight seal within the interior of the expansion joint 1400. In embodiments, custom spacers (not shown) may be inserted to precisely fill the space S between each adjacent band section 1471 and thereby improve the strength of and/or reliability of the seal.

Figure 15C:
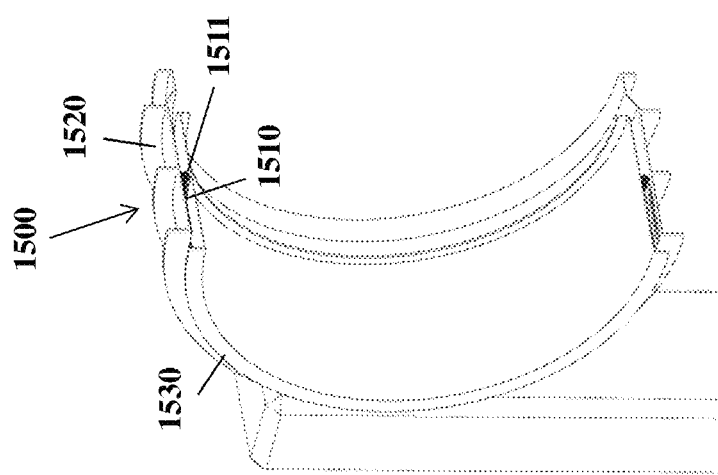
FIGS. 15A-15C illustrate a cut-away perspective view of an exemplary expansion joint at different states of expansion in accordance with aspects of the present disclosure.
Figure 15B:
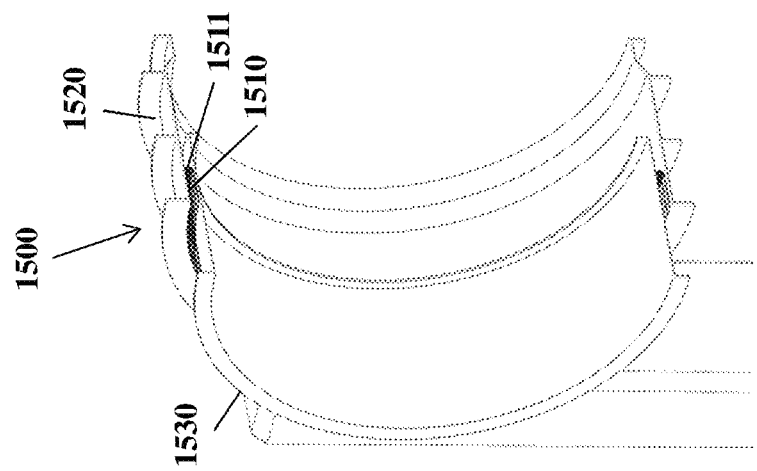
Figure 15A:
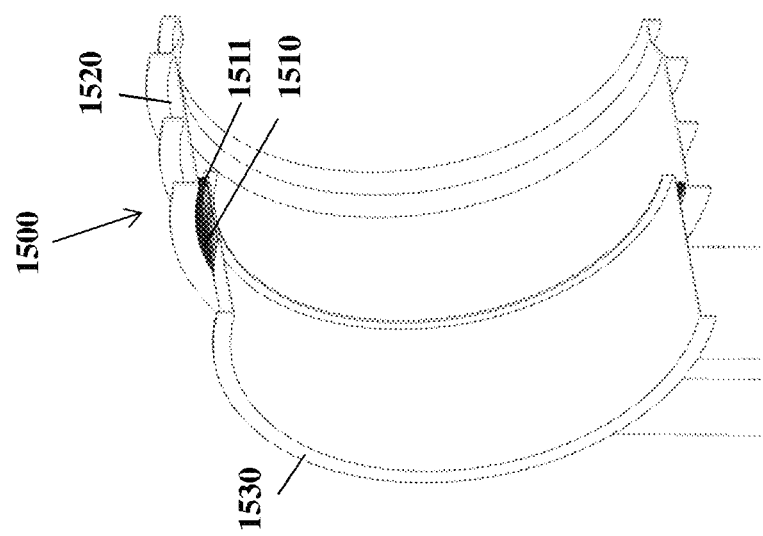

FIGS. 15A-15C show a cut-away perspective view of the rolling seal belt slip-style expansion joint 1500 in accordance with aspects of the present disclosure as the exterior tube 1520 and the interior tube 1530 slide longitudinally relative to each other, e.g., due to thermal expansion and/or contraction forces. FIG. 15A depicts an embodiment of the rolling seal belt 1510 in an extended state in which the rolling seal belt is extended longitudinally to the predetermined distance. As shown in FIG. 15B, as the portion of the interior tube 1530 recedes within the opening of the exterior tube 1520, additional portions of the rolling seal belt 1510 fold upon themselves and the folded portion 1511 rolls deeper into the interior of the exterior tube 1520. FIG. 15C depicts the rolling seal belt 1510 at a retracted position in which the rolling seal belt 1510 has further folded over upon itself and the folded portion 1511 has rolled further into the interior of the exterior tube 1520.

Figure 16:
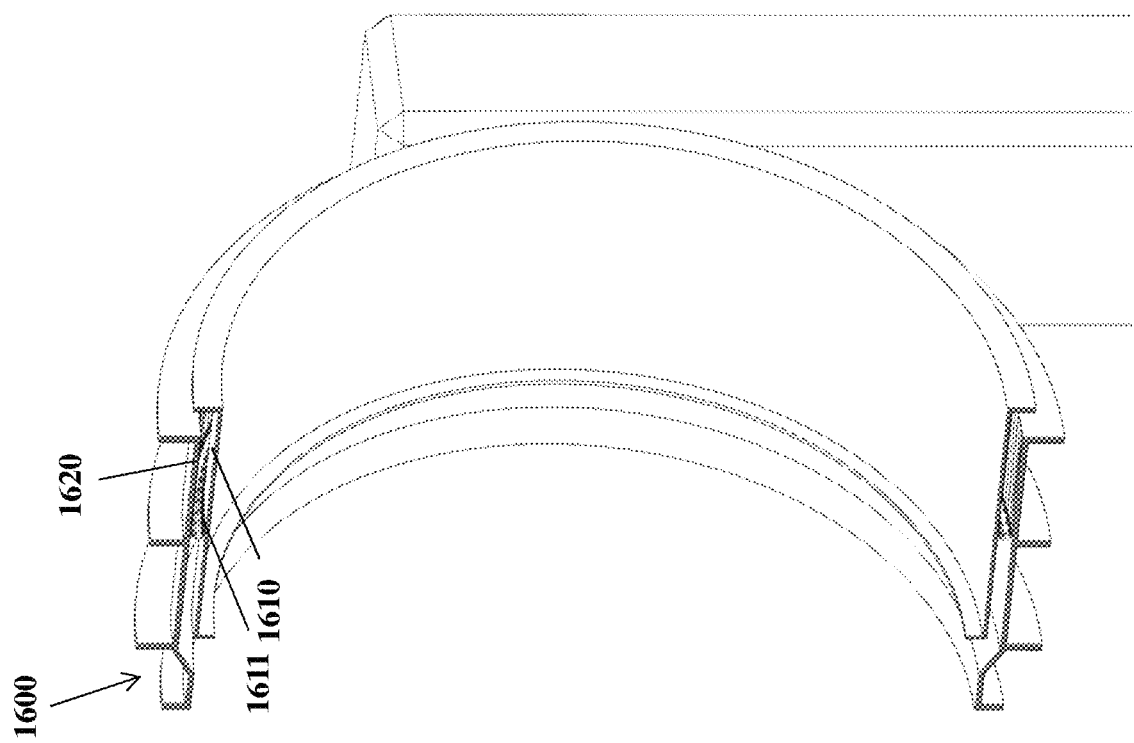
FIG. 16 illustrates another cut-away perspective view of an exemplary expansion joint in accordance with aspects of the present disclosure.

FIG. 16 illustrates another cut-away perspective view of the rolling seal belt slip-style expansion joint 1600 in accordance with aspects of the present disclosure with the rolling seal belt 1610 in the retracted position. As shown in the exemplary alternate view of FIG. 16, the rolling seal belt 1610 is folded over upon itself and the folded portion 1611 is rolled to depth with the interior of the exterior tube 1620.

Figure 17:
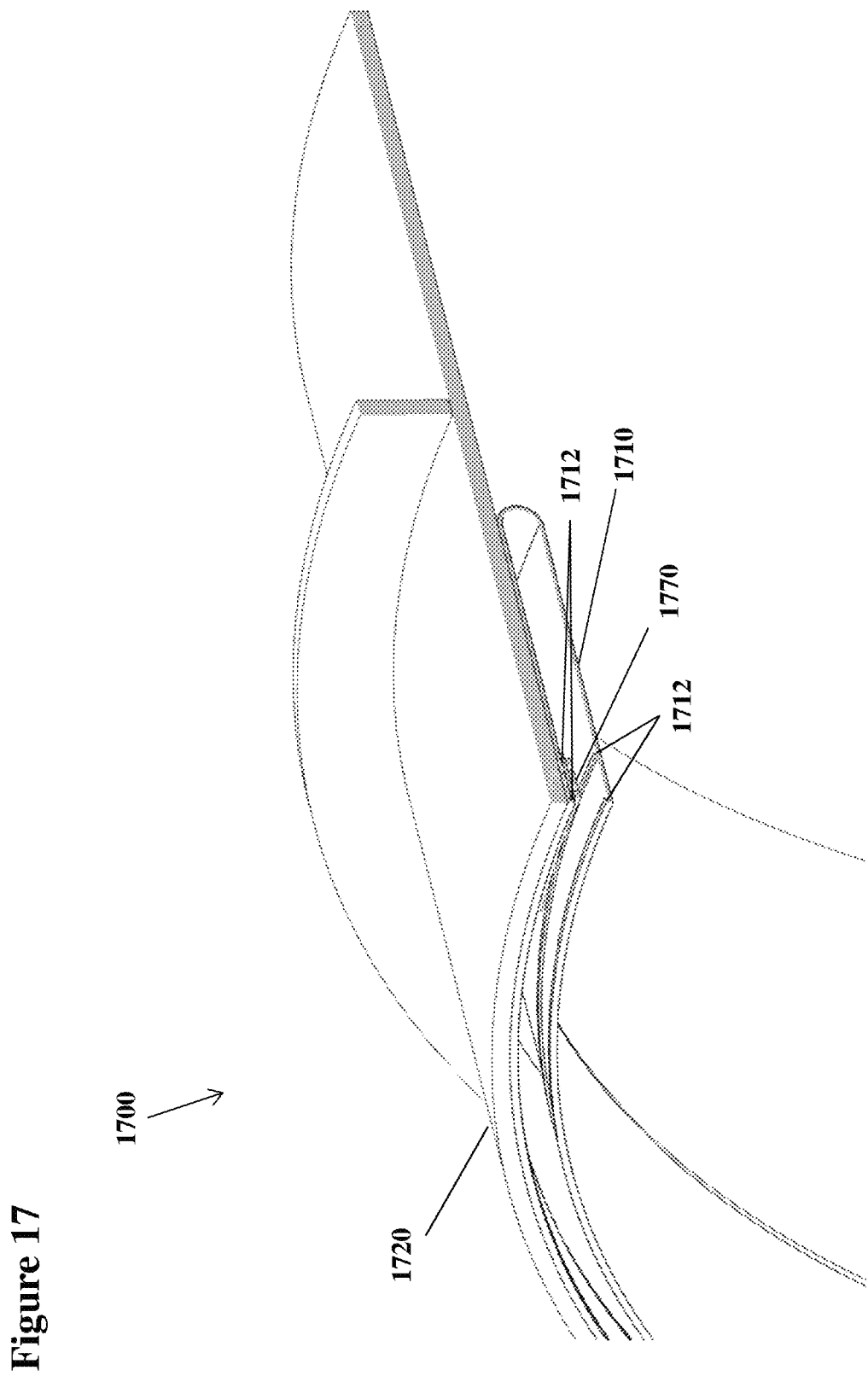
FIG. 17 illustrates a cut-away perspective view of an exemplary exterior tube and an exemplary rolling seal belt of an exemplary expansion joint in accordance with aspects of the present disclosure.

FIG. 17 shows a cut-away perspective view of an exemplary exterior tube 1720 and an exemplary rolling seal belt 1710 of the rolling seal belt slip-style expansion joint 1700 in accordance with the embodiments of the present disclosure. As shown in FIG. 17, the rolling seal belt 1710 may include at least one retaining groove 1712 arranged on a surface thereof. The at least one retaining groove 1712 may hold a connector 1770 in place that attaches the rolling seal belt 1710 to one of the exterior tube 1720 and the interior tube (described above). In embodiments, retaining grooves 1712 may be arranged at each end of the rolling seal belt 1710 to respectively hold and/or position connectors (not shown) for connecting each end of the rolling seal belt 1710 to a respective one of the exterior tube 1720 and the interior tube 1730.

Figure 18:
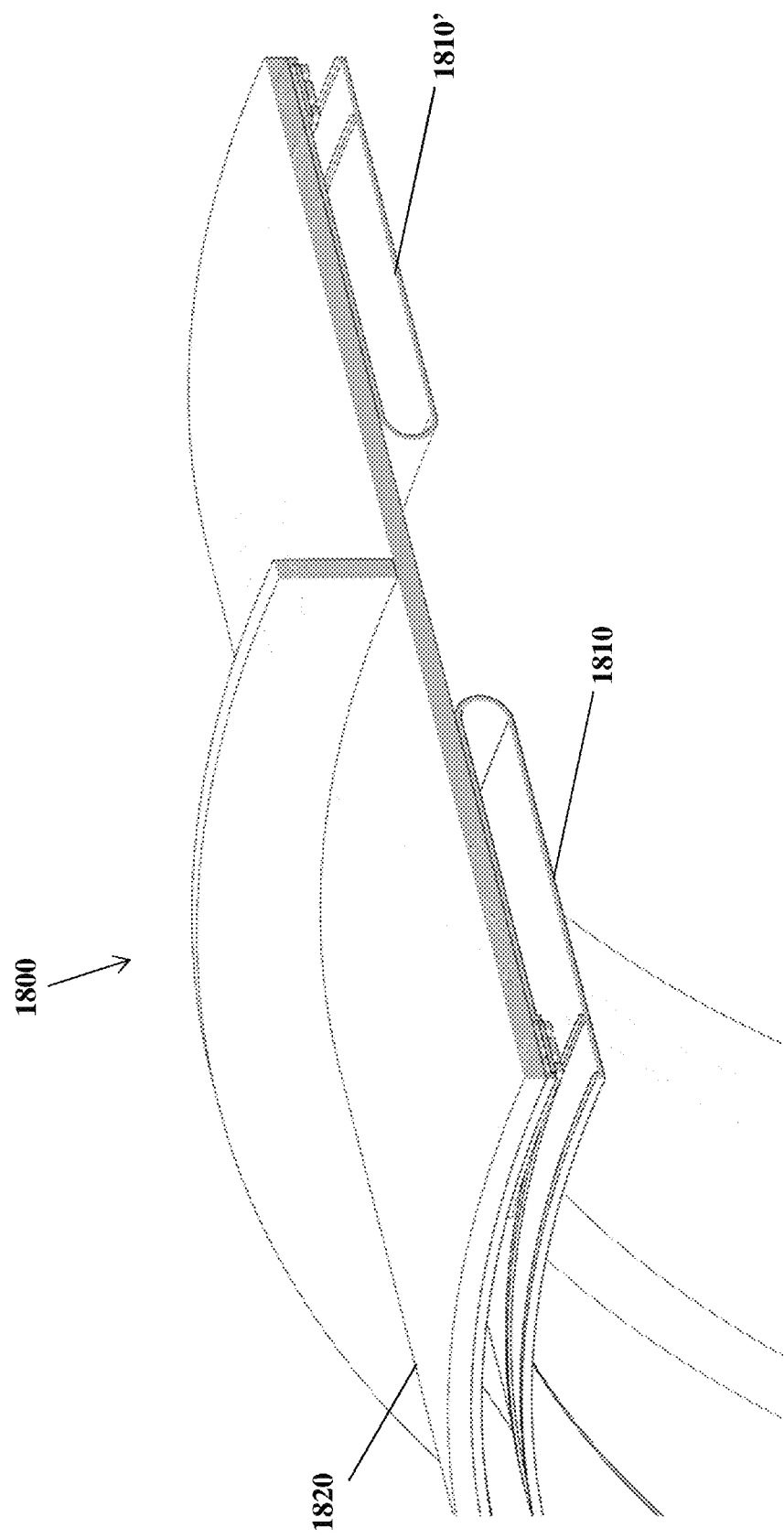
FIG. 18 illustrates an exemplary exterior tube having opposing exemplary rolling seal belts of an exemplary expansion joint in accordance with aspects of the present disclosure.

FIG. 18 shows a schematically-depicted sectional view of the rolling seal belt slip-style expansion joint 1800 in accordance with aspects of the present disclosure. As shown in FIG. 18, in embodiments the expansion joint 1800 may include two rolling seal belts 1810, 1810' disposed at opposing openings of the exterior tube 1820. In embodiments, first and second interior tubes (not shown) may be accommodated within the exterior tube 1820, effectively doubling the amount of lateral expansion and/or contraction accommodated by the slip-style expansion joint 1800. In accordance with further aspects of the disclosure, including rolling seal belts 1810, 1810' at both ends of the exterior tube 1820 allows for sealing of the interior of the exterior tube 1820, which improves the reliability during testing of the slip-style expansion joint 1800 since the efficacy of the seal can be tested at a predetermined pressure.

Figure 19:
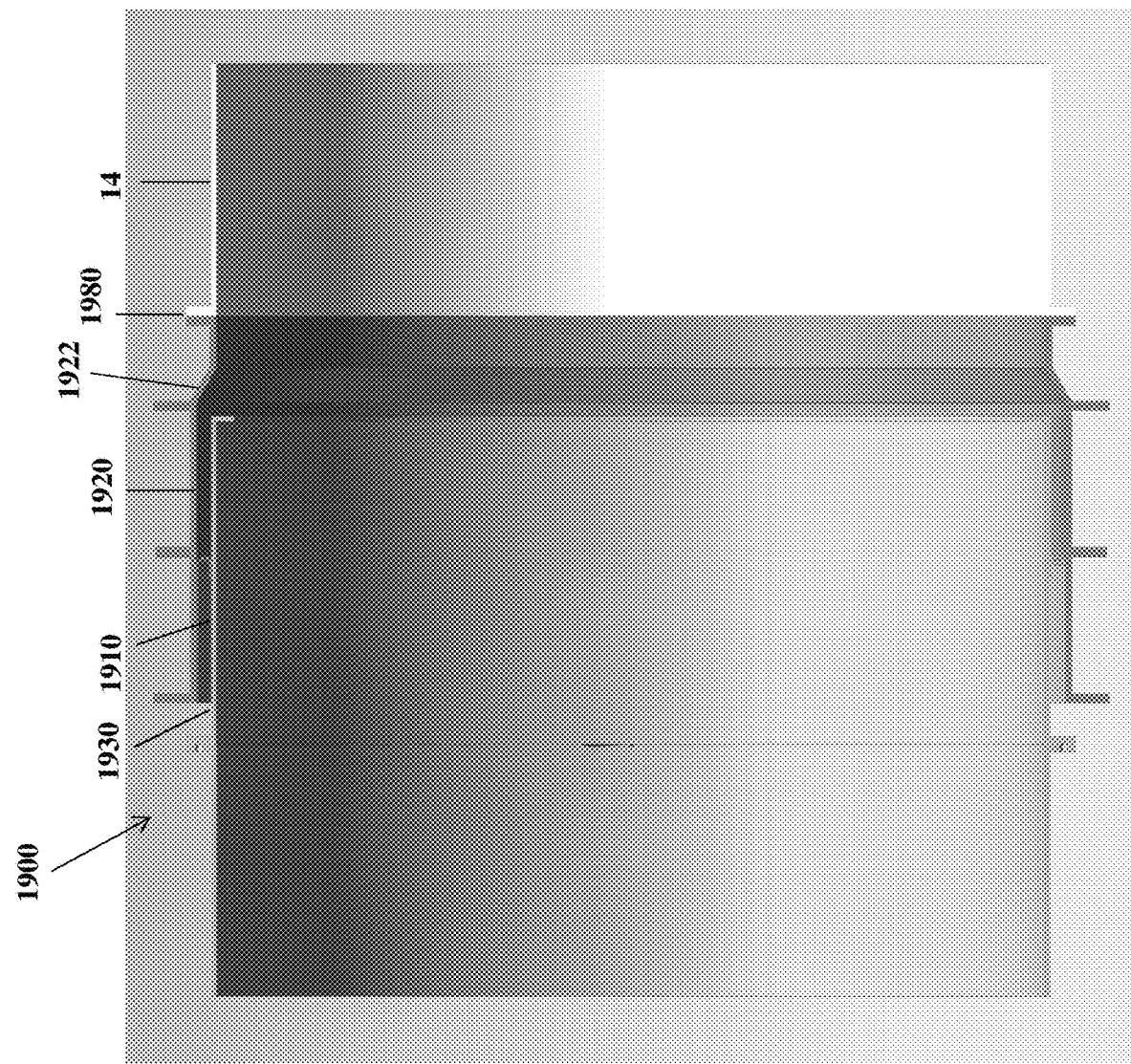
FIG. 19 illustrates another schematically-depicted sectional view of an exemplary expansion joint in accordance with aspects of the present disclosure.

FIG. 19 shows another schematically-depicted sectional view of the rolling seal belt slip-style expansion joint 1900 in accordance with aspects of the present disclosure. In embodiments, the expansion joint 1900 may include the rolling seal belt 1910, the exterior tube 1920, and the interior tube 1930 including a portion disposed within the rolling seal belt 1910 and within an opening of the exterior tube 1920. As shown in FIG. 19, the exterior tube 1920 may include a tapered portion 1922 connected to the enclosed structure 14 of the transportation system via a flanged connection 1980.

Figure 20:
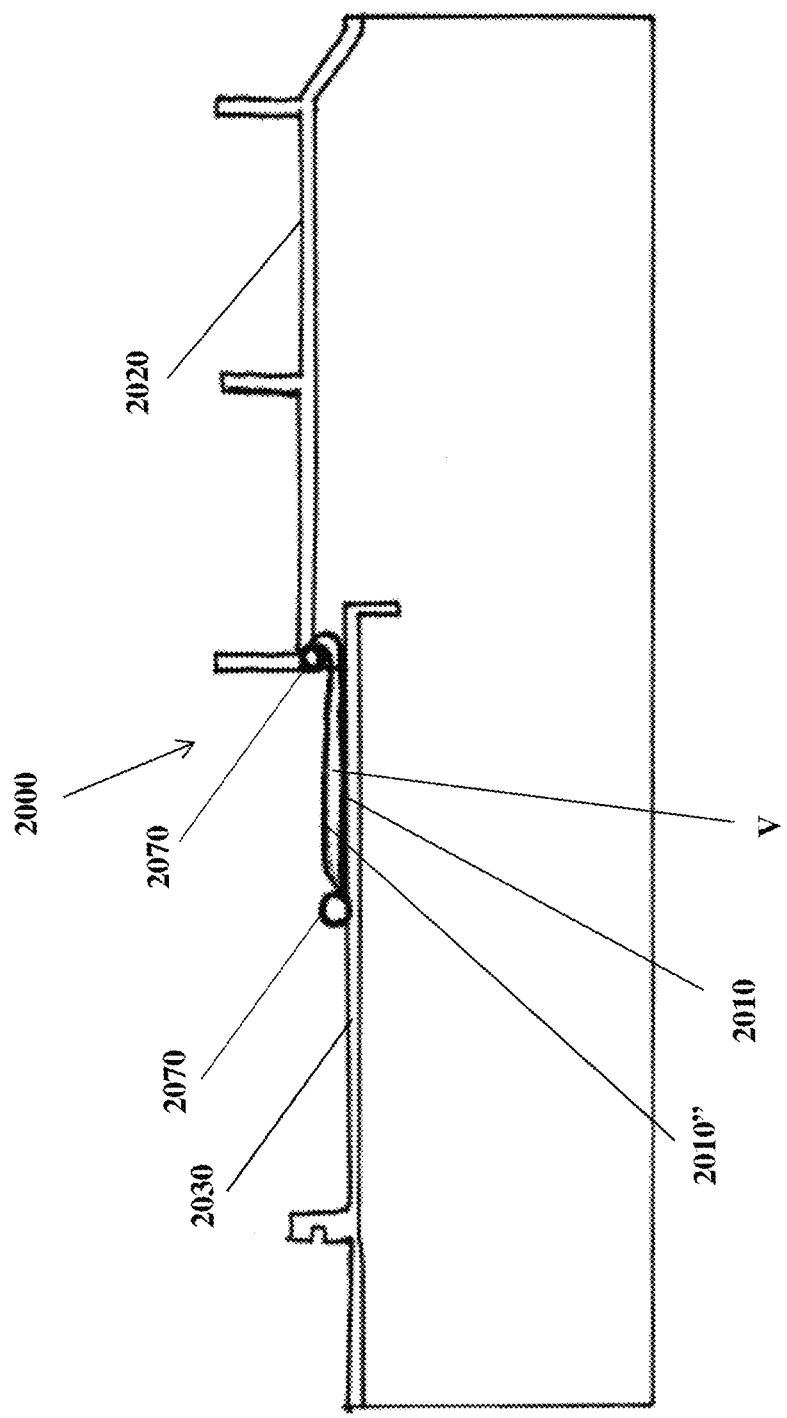
FIG. 20 illustrates a partial schematically-depicted sectional view of an exemplary expansion joint having an exemplary two rolling seal belt arrangement in accordance with aspects of the present disclosure.

FIG. 20 shows a partial schematically-depicted sectional view of an exemplary rolling seal belt slip-style expansion joint 2000 in accordance with embodiments of the present disclosure. The expansion joint 2000 may include two rolling seal belts 2010, 2010" attached to each other such that the two belts 2010, 2010" share each common connection points 2070 to the exterior and interior tubes 2020, 2030. The inner surface of the first rolling seal belt 2010 may be adjacent to the outer surface of the second rolling seal belt 2010" and the volume V between the two belts 2010, 2010" may be pressurized with a fluid to a pressure above ambient pressure so that the volume V between the two belts 2010, 2010" may be inflated. In embodiments, when the exterior and interior tubes 2020, 2030 move relative to each other, the volume V between the belts may retain its size and pressure.

Figure 21B:
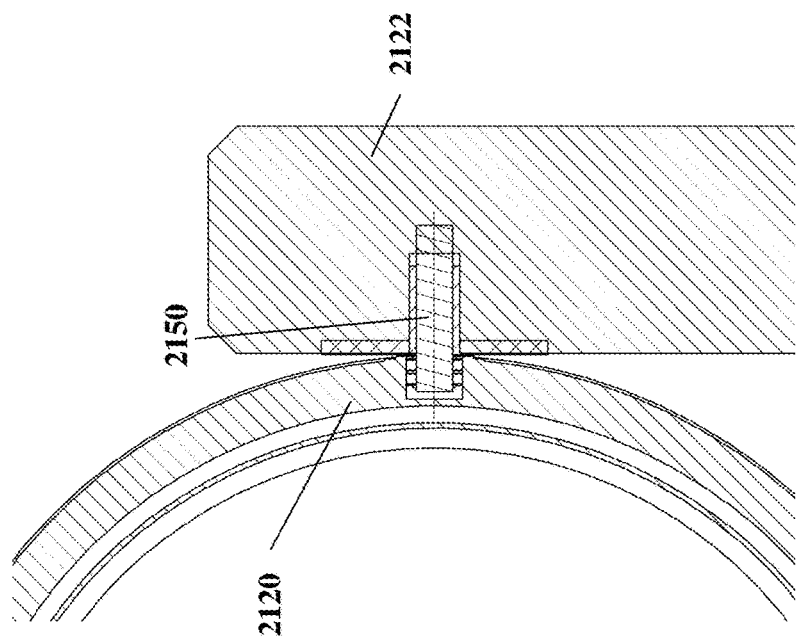
FIG. 21B illustrates a partial cut-away sectional view of an exemplary expansion joint in accordance with aspects of the present disclosure.
Figure 21A:
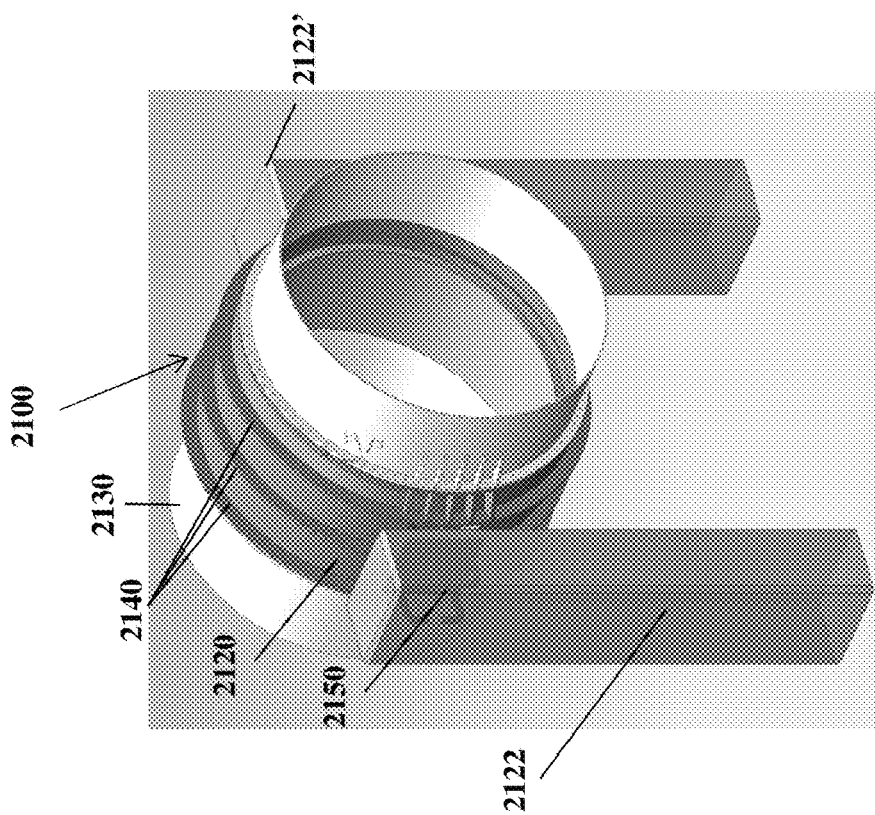
FIG. 21A illustrates a schematically-depicted perspective view of an exemplary expansion joint in accordance with aspects of the present disclosure.

FIG. 21A depicts a schematically-depicted perspective view of an exemplary slip-style expansion joint 2100 in accordance with aspects of the present disclosure. The expansion joint 2100 may be mounted to pylons 2122, 2122' of the exterior tube 2120 of the expansion joint 2100 via support bearings 2150. The interior tube 2130 may be mounted to pylons (not shown) disposed a lateral distance from pylons 2122, 2122' in a similar manner. By vertically supporting the exterior tube 2120 and the interior tube 2130 via pylons in this manner, the gap G (previously described in reference to the embodiment shown in FIG. 12) between the exterior tube 2120 and the interior tube 2130 may be maintained.

In the partial cut-away sectional view shown in FIG. 21B, an embodiment in accordance with the present disclosure of the support bearing 2150 is depicted. The support bearing 2150 may connect the exterior tube 2120 to the pylon 2122. However, the connection of the expansion joint 2100 to the pylons 2122, 2122' is not to be limited to the depicted exemplary support bearing 2150, and any functional equivalent structure may be used for the connection.

As shown in FIG. 21A, the expansion joint 2100 may include circumferential stiffeners 2140 arranged on an outer circumferential surface of the expansion joint 2100 to maintain the shape of the expansion joint 2100. In embodiments, the circumferential stiffeners 2140 may be comprised of a hardened material, such as steel. In embodiments, the circumferential stiffeners 2140 may have an inner diameter that is substantially similar to an outer diameter of the exterior tube 2120 and/or the interior tube 2130 that the respective stiffener 2140 is attached to. The circumferential stiffeners 2140 may be attached to the expansion joint 2100 via welding, and/or bolts, for example. According to embodiments of the disclosure, the circumferential stiffeners 2140 may have a thickness that exceeds (e.g., by 3 inches) the thickness of the exterior tube 2120 and/or the interior tube 2130 that the circumferential stiffeners 2140 are attached to. In embodiments, the circumferential stiffeners 2140 may increase a magnitude of axial excursions that can be accommodated by the expansion joint 2100. In embodiments, circumferential stiffeners may be applied to any of the expansion joints disclosed herein.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, while many of the structures discussed herein may be used in the context of a low-pressure environment for a high-speed transportation system, the enclosed environments may also be utilized in different contexts (e.g., other high-speed transportation systems). Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the invention has been described with reference to specific embodiments, those skilled in the art will understand that various changes may be made and equivalents may be substituted for elements thereof without departing from the true spirit and scope of the invention. While exemplary embodiments are described above, it is not intended that these embodiments describe all possible forms of the invention. Rather, the words used in the specification are words of description rather than limitation, and it is understood that various changes may be made without departing from the spirit and scope of the disclosure. In addition, modifications may be made without departing from the essential teachings of the invention. Furthermore, the features of various implementing embodiments may be combined to form further embodiments of the invention.

What is claimed is:

1. A tubular structure, comprising:
   at least one exterior tube having an opening and an interior;
   at least one interior tube, at least a portion of the at least one interior tube is configured to be disposed through the opening and within the interior of the at least one exterior tube; and
   at least one expansion joint provided between the at least one exterior tube and the portion of the at least one interior tube, wherein
   the at least one expansion joint is configured to allow lateral expansion and contraction of the exterior tube and the interior tube while maintaining a predetermined pressure within the exterior and the interior tubes, and
   the expansion joint comprises a removable O-ring sled structured and arranged to be attached to an end of the exterior tube.

2. The tubular structure of claim 1, further comprising at least one friction sliding pad structured and arranged on an inner circumferential surface of the exterior tube, wherein
   the at least one friction sliding pad supports an outer circumferential surface of the portion of the interior tube and provides a low friction surface for facilitating sliding of the interior tube relative to the exterior tube in a longitudinal direction of the tubular structure.

3. The tubular structure of claim 1, wherein
   the expansion joint further comprises a service seal structured and arranged within the interior of the exterior tube beyond the O-ring sled in a longitudinal direction of the exterior tube,
   the service seal is structured and arranged to selectively provide a seal between the exterior tube and the interior tube.

4. The tubular structure of claim 3, wherein
   the service seal and the O-ring sled are each configured to independently provide a seal between the exterior tube and the interior tube.

5. The tubular structure of claim 3, wherein
   the service seal comprises an inflatable seal that, when inflated, selectively provides the seal between the exterior tube and the interior tube.

6. The tubular structure of claim 1, wherein
   the O-ring sled comprises at least one sealing O-ring structured and arranged to form a seal between the exterior tube and the interior tube.

7. The tubular structure of claim 6, wherein
   the at least one sealing O-ring is a T-style O-ring.

8. The tubular structure of claim 1, wherein
   the O-ring sled comprises at least one lubricator that is configured to lubricate an outer circumferential surface of the interior tube.

9. The tubular structure of claim 8, further comprising a lubricant reservoir, wherein the lubricator contacts the outer circumferential surface of the interior tube and supplies lubricant via the lubricant reservoir disposed on an outer circumferential surface of the exterior tube.

10. The tubular structure of claim 1, wherein
    the O-ring sled is structured and arranged in at least two segments so as to be removable from the expansion joint without requiring removal of the portion of the at least one interior tube configured to be disposed within the interior of the at least one exterior tube.

11. A method of maintaining a predetermined pressure within a tubular structure having an interior tube, an exterior tube, a pressure-tight service seal, at least one expansion joint provided between the at least one exterior tube and the portion of the at least one interior tube, wherein the at least one expansion joint is configured to allow lateral expansion and contraction of the exterior tube and the interior tube while maintaining a predetermined pressure within the exterior and the interior tubes, and the expansion joint comprises a removable O-ring sled disposed between the interior tube and the exterior tube and structured and arranged to be attached to an end of the exterior tube, the method comprising:

establishing an interior of the tubular structure at the predetermined pressure;

engaging the pressure-tight service seal between the interior tube and the exterior tube; and removing the O-ring sled from the tubular structure while the pressure-tight service seal maintains the predetermined pressure of the interior of the tubular structure.

\* \* \* \* \*